United States Patent
Ikenaka et al.

(10) Patent No.: US 7,289,415 B2
(45) Date of Patent: Oct. 30, 2007

(54) OPTICAL PICK-UP APPARATUS AND DIVERGENT ANGLE-CONVERTING ELEMENT

(75) Inventors: Kiyono Ikenaka, Hino (JP); Shinichiro Saito, Hachioji (JP); Yuichi Atarashi, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 543 days.

(21) Appl. No.: 10/976,844

(22) Filed: Nov. 1, 2004

(65) Prior Publication Data
US 2005/0094537 A1    May 5, 2005

(30) Foreign Application Priority Data
Nov. 4, 2003   (JP) ............................. 2003-374625
Nov. 14, 2003  (JP) ............................. 2003-385526

(51) Int. Cl.
   *G11B 7/00*   (2006.01)
(52) U.S. Cl. .............................. 369/112.05; 369/112.08
(58) Field of Classification Search ........... 369/112.05, 369/112.08
See application file for complete search history.

(56) References Cited

U.S. PATENT DOCUMENTS

| | | | |
|---|---|---|---|
| 7,177,089 B2 * | 2/2007 | Kimura | 359/661 |
| 7,206,274 B2 * | 4/2007 | Ikenaka | 369/112.01 |
| 2005/0078593 A1 * | 4/2005 | Maruyama et al. | 369/112.23 |

* cited by examiner

*Primary Examiner*—Wayne Young
*Assistant Examiner*—Adam R. Giesy
(74) *Attorney, Agent, or Firm*—Finnegan, Henderson, Farabow, Garrett & Dunner, L.L.P.

(57) ABSTRACT

An optical pickup apparatus comprising: a first light source emitting first light flux having wavelength $\lambda 1$ (380 nm$\leq \lambda 1 \leq$450 nm); a second light source emitting second light flux having wavelength $\lambda 2$ (600 nm$\leq \lambda 2 \leq$700 nm); a third light source emitting third light flux having wavelength $\lambda 3$ (750 nm$\leq \lambda 3 \leq$800 nm); a first divergent angle-converting element through which the first light flux passes; a second divergent angle-converting element through which the second light flux and the third light flux pass; and an objective optical element through which the first, second, and third light fluxes pass. Optical magnification m2 of the second divergent angle-converting element for the second light flux and optical magnification m3 of the second divergent angle-converting element for the third light flux are different from each other.

63 Claims, 4 Drawing Sheets

OPTICAL PICK-UP APPARATUS AND DIVERGENT ANGLE-CONVERTING ELEMENT

RELATED APPLICATIONS

This application is based on patent applications Nos. 2003-374625 and 2003-385526 filed in Japan, the entire content of which is hereby incorporated by reference.

TECHNICAL FIELD

The present invention relates to an optical pick-up apparatus and a divergent angel-converting element.

BACKGROUND

Recently, the research and development of a so-called high density optical disk in which, by using a blue laser light of wavelength of about 400 nm, the recording density of the optical information recording medium (optical disk) is increased, and the memory capacity is enlarged, are advanced. As a standard of the high density optical disk, for example, a standard in which an image side numerical aperture (NA) of an objective lens is about 0.85, the protective-substrate thickness is about 0.1 mm, or a standard in which NA and the protective substrate thickness are controlled to about 0.65 and about 0.6 mm, which are about same degree as a conventional DVD (Digital Versatile Disk), is well-known. In the following description, a high density optical disk in which NA is about 0.85, a protective substrate thickness is about 0.1 mm, is expressed as "BD (Blu-ray Disc), and a high density optical disk in which NA is about 0.65, a protective substrate thickness is about 0.6 mm, is expressed as "AOD (Advanced Optical Disc)". AOD is sometimes called as "HD-DVD (High Density-DVD)".

Then, various technologies relating to an optical pick-up apparatus having a compatibility of such a high density optical disk with a conventionally widely used optical disk such as DVD or CD (Compact Disk), are proposed.

Hereupon, the wavelengths $\lambda 1/\lambda 2/\lambda 3$ of the light fluxes used for AOD/DVD/CD are respectively about 400 nm/about 650 nm/about 780 nm, and the protective substrate thickness t1/t2/t3 are respectively about 0.1 mm/about 0.6 mm/about 1.2 mm.

For attaining the compatibility between such a plurality of kinds of optical disks, it is necessary that the aberration generated due to the difference of wavelengths or protective substrate thickness is corrected while the light amounts of the light flux used for each of optical disks are assured, and the technology to provide the diffractive structure on the optical surface of the optical element constituting the optical pick-up apparatus is disclosed. For example, the invention disclosed in Japanese Un-examined Patent Application Publication (hereinafter, referred to as JP-A) No. 8-249707, is an optical pick-up apparatus for DVD/CD compatibility, and when a hologram collimator is arranged just before the objective lens, the reproduction of DVD is conducted by using the first-order diffraction light, and the reproduction of CD is conducted by using the non-diffraction light.

Further, to intend the size reduction of the optical pick-up apparatus, there is a case where a light source unit in which 2 light sources for emitting the light fluxes of different wavelengths are packaged into one package, is used, and in this case, for the purpose that the incident angles on the objective lens are made different for 2 kinds of light fluxes, the technology in which a coupling lens or a collimator is arranged, is widely known. For example, the invention disclosed in JP-A No. 2001-236680, is the optical pick-up apparatus for DVD/CD compatibility using the light source unit, and in which, by providing the diffractive structure on the coupling lens, the chromatic aberration of the coupling lens itself generated due to the wavelength difference between 2 kinds of light fluxes is corrected.

However, in the invention disclosed in the above patent document JP-A No. 8-249707, because the reproduction of CD is conducted by using the non-diffraction light, it does not has a sufficient correction function as compared to a case where the diffraction light is used.

On the one hand, to attain the compatibility by the high density optical disk/DVD/CD, it is necessary that, not only the correction of the aberration generated due to the difference of the wavelength or the protective substrate thickness as described above, but also the chromatic aberration generated due to the wavelength variation of the light flux used for the high density optical disk is corrected, it is difficult that aberration is sufficiently corrected by the technology disclosed in the above patent documents.

Specifically, to make 3 optical disks compatible, it is found necessary that, even when the objective lens is formed of the refractive lens or the diffractive lens, the optical magnifications of the objective lens for DVD and CD are made different. However, when, to assure the light amount, the optical magnification of the entire pick-up is made a predetermined value, or when the light source unit called 2LD1P which is in the market, is used, in the case where it is desired that the distance from the collimator to the light source is set at designer's discretion for DVD and CD, form the relationship of the pick-up space, it is necessary that the light is incident on the objective lens at an angle of light coincident to its optical magnification, in spite of the position of the light source. Accordingly, when the collimator or coupling lens is commonly used for DVD and CD, it is desired that the optical magnification of one collimator or coupling lens is different corresponding to the wavelength.

SUMMARY OF THE INVENTION

Above problems are considered, and an object of the present invention is to provide an optical pick-up apparatus which has the compatibility of a high density optical disk, DVD with CD, and in which the light amount assurance and the aberration correction stand together, and a divergent angle-converting element.

The object can be attained by the following structure.

The first structure of the present invention is an optical pick-up apparatus comprising: a first light source emitting a first light flux having a wavelength of $\lambda 1$, which satisfies 380 nm$\leq \lambda 1 \leq$450 nm, the first light source being utilized for recording information on and/or for reproducing information from a first optical information recording medium having a first protective substrate having a thickness of t1 on an information recording surface; a second light source emitting a second light flux having a wavelength of $\lambda 2$, which satisfies 600 nm$\leq \lambda 2 \leq$700 nm, the second light source being utilized for recording information on and/or for reproducing information from a second optical information recording medium having a second protective substrate having a thickness of t2, which satisfies t1$\leq$t2, on an information recording surface; a third light source emitting a third light flux having a wavelength of $\lambda 3$, which satisfies 750 nm$\leq \lambda 3 \leq$800 nm, the third light source being utilized for recording information on and/or for reproducing information from a third optical information recording medium having a third protective substrate having a thickness of t3, which satisfies t2<t3, on an information recording surface; a first divergent angle-converting element, through which at least the first light flux passes; a second divergent angle-converting element, through which at least the second light flux and the third light flux passes; and an objective optical element through which the first light flux, the second light flux and the third light flux pass. The optical pick-up apparatus is characterized in that: the optical magnification m2 of the second divergent angle-converting element to the second light flux, and the optical magnification m3 of the second divergent angle-converting element to the third light flux are different from each other.

According to the present invention, because the light can be made incident on the objective lens at an angle corresponding to the image formation magnification of the objective lens, the compatibility of the wavelength λ2 with wavelength λ3 can be attained.

The second structure of the present invention is a divergent angle-converting element for use in an optical pickup apparatus for conducting reproducing information from and/or recording information on a first optical information recording medium including a first protective substrate having a thickness t1 on an information recording surface with a first light flux having a wavelength λ1 (380 nm≦λ1≦450 nm) emitted from a first light source, for conducting reproducing information from and/or recording information on a second optical information recording medium including a second protective substrate having a thickness t2 (t1≦t2) on an information recording surface with a second light flux having a wavelength λ2 (600 nm≦λ2≦700 nm) emitted from a second light source, and for conducting reproducing information from and/or recording information on a third optical information recording medium including a third protective substrate having a thickness t3 (t2≦t3) on an information recording surface with a second light flux having a wavelength λ2 (750 nm≦λ3≦800 nm) emitted from a third light source. The divergent angle-converting element is characterized in that: m2 which is an optical magnification of the divergent angle-converting element for the second light flux when the second light flux passes through the divergent angle-converting element, is different from m3, which is an optical magnification of the second divergent angle-converting element for the third light flux when the third light flux passes through the divergent angle-converting element. Further, the divergent angle-converting element is characterized in that: T2, which is a distance between a luminous point of the second light source and the information recording surface of the second optical information recording medium, and T3, which is a distance between a luminous point of the third light source and the information recording surface of the third optical information recording medium, satisfy the following equation.

$$T2+0.6=T3$$

According to the structure, because the light can be made incident on the objective lens at an angle corresponding to the image information magnification of the objective lens, the compatibility of the wavelength λ2 with the wavelength λ3 can be attained. Further, in DVD and CD, the optical system from the light source to the objective lens can be made common.

The invention itself, together with further objects and attendant advantages, will best be understood by reference to the following detailed description taken in conjunction with the accompanying drawings.

DETAILED DESCRIPTION OF THE INVENTION

Figure 1:
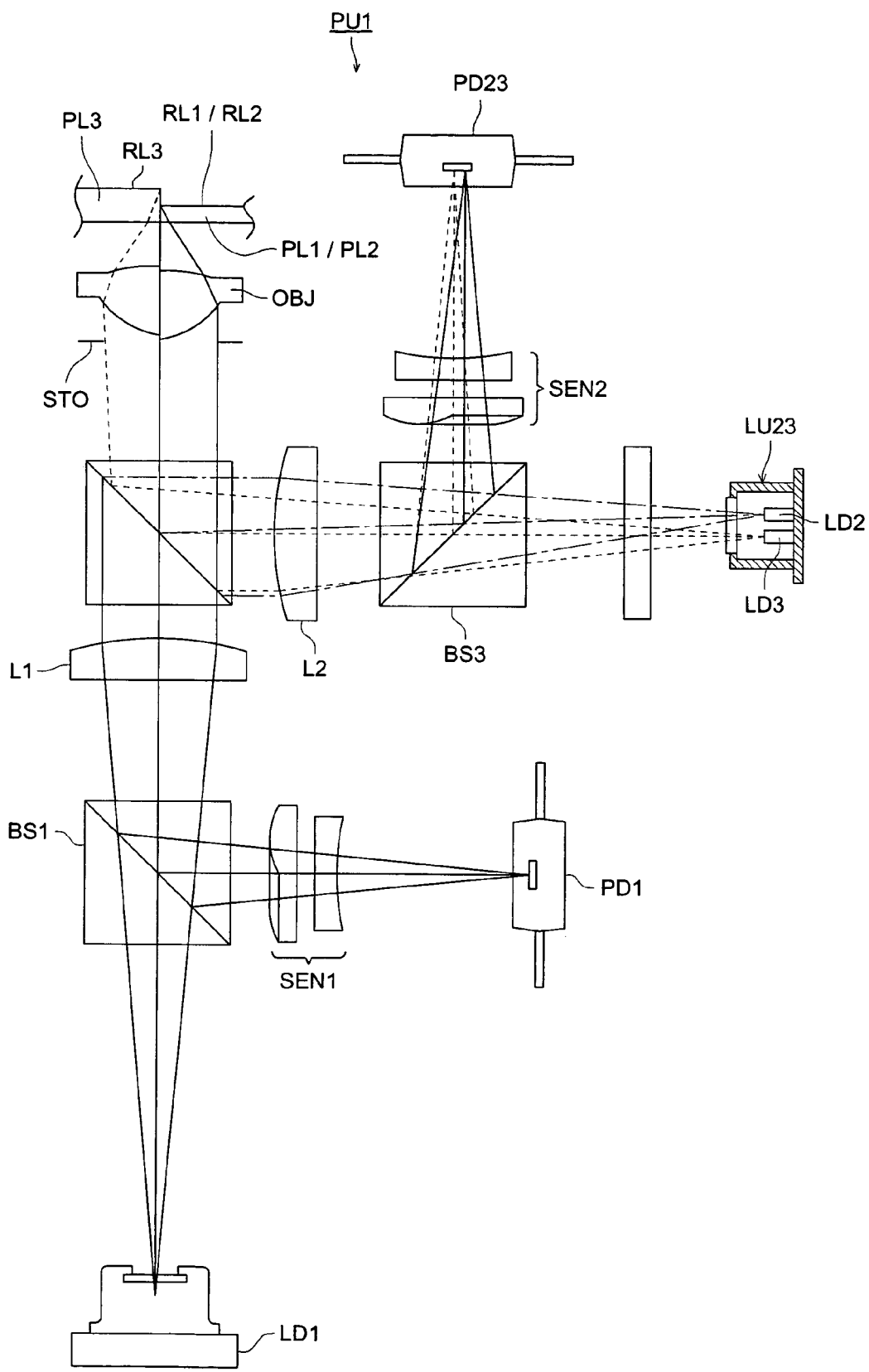
FIG. 1 is an outline view showing a structure of an example of an optical-pick-up apparatus.

In the present description, "chromatic aberration" means an aberration in which, when the wavelength of the light is changed by +1 nm, a varied amount (μm) of the wave-front aberration minimum position relating to the optical axis direction of the light converging spot on the optical information recording medium is expressed in such a manner that the direction in which it is apart from the objective optical element, is positive, and it is expressed in a unit of μm/nm. Further, "the chromatic aberration, which the ~element has or possesses" means an aberration in which, when the element single body is estimated, and when the wavelength of the light is changed by +1 nm, the varied amount of the wave-front aberration minimum position in the optical axis direction of the light converging spot is expressed in such a manner that the direction in which it is apart from the objective optical element, is positive.

Further, "numerical aperture on image surface side" means a numerical aperture (beam diameter conversion NA) converted from a spot diameter of the light converging spot formed on the information recording-surface of the optical information recording medium.

Further, even when an optical element formed of a general optical material such as plastic or glass is used, the optical magnification of the optical element is changed corresponding to a change of the wavelength by the dispersion of the optical material, however, in the present invention, "optical magnifications m2 and m3 to light fluxes of the wavelength λ2 and the wavelength λ3 of the divergent angle-converting element are different from each other" means that, when, on the divergent angle-converting element, a structure having the wavelength dependency (wavelength selectivity) such as, for example, diffractive structure is provided, the larger change (difference) of optical magnification is made generated, as compared to the change of the optical magnification due to the dispersion as described above.

In the optical pick-up apparatus as the first structure of the present invention, it is preferable that the first divergent angle-converting element is a collimator.

Further, it is preferable that, the distance T2 (mm), which is a distance between a luminous point of the second light source and the information recording surface of the second optical information recording medium, and the distance T3 (mm), which is a distance between a luminous point of the third light source and the information recording surface of the third optical information recording medium, satisfy $$T2+0.6=T3.$$

According to the present invention, when a structure in which the parallel light is incident on the objective lens in the high density optical disk in which the aberration generation amount to the error is large for reason that the wavelength is shortest and NA is also large, is applied, the pick-up is easily adjusted, and even when the error is generated, the generated aberration can be controlled. Further, when T2+0.6=T3, because the distance from the divergent angle-converting element to the light source can be made equal, by using 2LD1P in the market, the downsizing of the pick-up apparatus can be intended.

Further, in the optical pick-up apparatus of the present invention, it is preferable that t1=t2. According to the present invention, because the difference among t1, t2, t3 is small, when the optical magnification of the objective lens to the light of wavelength λ1 is 0, the optical magnification to the other light is also near to zero. Because the light incident on the objective lens comes near to the infinite parallel light, even when the objective lens shifts in the direction perpendicular to the optical axis as at the time of tracking, the aberration deterioration is suppressed.

In the optical pick-up apparatus of the present invention, it is preferable that −1/50≦m2≦1/50, 1/10≦m3≦1/4 are satisfied.

According to the present invention, because the light of wavelengths λ2 and λ3 is incident on the objective lens at an appropriate angle, the recording and reproducing of the second optical information recording medium and the third optical information recording medium can be conducted.

Further, in the optical pick-up apparatus of the present invention, it is preferable that the first diffractive structure is provided on at least one optical surface of the second divergent angle-converting element.

According to: the present invention, because the diffractive structure can give the diffraction effect depending on the wavelength, it is a structure appropriate to the divergent angle-converting element in which the optical magnification is made different corresponding to the wavelength in this manner.

It is more preferable that the first diffractive structure includes plural ring shaped diffractive zones concentrically provided around an optical axis of the second divergent angle-converting element, and has a cross-section shape of a saw-tooth structure.

According to the present invention, the first diffractive structure is preferably a blazed diffractive structure by which the diffraction efficiency of a specific diffraction order is become high, and is optimum as a structure formed on the optical element through which the light requiring a light amount as in the recording and reproducing of the optical disk, goes.

Further, it is preferable that d1, which is a height in an optical axis direction of a step between each of the ring shaped diffractive zones, satisfies the following relation.

$$0.9 \times \lambda 2/(n-1) \leq d1 \leq 1.5 \times \lambda 3/(n3-1)$$

Where n2 represents a refractive index of a material constituting the second divergent angle-converting element for a light having a wavelength of λ2, and n3 represents a refractive index of a material constituting the second divergent angle-converting element for a light having a wavelength of λ3.

Further, it is more preferable that recording information on and/or reproducing information from the second optical information recording medium are conducted with a first-order diffractive ray of the second light flux, which is generated by a diffraction effect of the first diffractive structure, and recording information on and/or reproducing information from the third optical information recording medium are conducted with a first-order diffractive ray of the third light flux, which is generated by a diffraction effect of the first diffractive structure.

According to the present invention, for both of the light of the wavelengths λ2 and λ3, the diffraction efficiency can be increased.

Further, it is also a preferable mode that the first diffractive structure is a superposed diffractive structure having plural ring shaped zones concentrically provided around an optical axis of the second divergent angle-converting element, and each of the ring shaped zones further includes plural concentric stair-like structures thereon.

According to the present invention, in the light of the wavelengths λ2 and λ3, one light is diffracted, and the other light can be transmitted, and the diffractive effect can be selectively given.

Further, it is more preferable that d1, which is a height in an optical axis direction of a step between each of the concentric stair-like structures satisfies the following relation:

$$0.9 \times \lambda 2/(n2-1) \leq d1 \leq 1.5 \times \lambda 3/(n3-1).$$

Where n2 represents a refractive index of a material constituting the second divergent angle-converting element for a light having a wavelength of λ2, and n3 represents a refractive index of a material constituting the second divergent angle-converting element for a light having a wavelength of λ3.

Further, in the pick-up apparatus of the present invention, it is preferable that when the optical pickup apparatus is operated, a chromatic aberration of a first converged spot, which is formed by the first light flux on the information recording surface of the first optical information recording medium, is controlled within a range necessary for recording information on and/or reproducing information from the second optical information recording medium, and a chromatic aberration of a second converged spot, which is formed by the second light flux on the information recording surface of the second optical information recording medium, is controlled within a range necessary for recording information on and/or reproducing information from the second optical information recording medium.

According to the present invention, because the wavelength is short and NA is high, to the light of the wavelength λ1, λ2 whose wave-front aberration rapidly increases to the defocus amount, the optical system in which defocus is not generated even when the wavelength is varied, can be attained. Generally, there is a phenomenon called mode-hop in the laser, and when it is switched from the low power to the high power, the using wavelength is instantaneously changed, the actuator can not follow it. In such a case, when the chromatic aberration is corrected, the recording and the reproducing can be accurately conducted.

It is further preferable that an absolute value of a chromatic aberration of the first converged spot is controlled to not more than 0.15 μm/nm, and an absolute value of a chromatic aberration of the second converged spot is controlled to not more than 0.2 μm/nm.

According to the present invention, even when the defocus is generated to the wavelength variation amount at the time of the mode-hop happened in the general laser, the recording and reproducing can be accurately conducted.

Further, in the optical pick-up apparatus of the present invention, it is preferable that, in optical surfaces of the second divergent angle-converting element, on the optical surface on which the first diffractive structure is not provided, the second diffractive structure is provided.

According to the present invention, when 2 diffractive structures are provided more than 1, the design of freedom can be increased. The second divergent angle-converting element performs 2 roles in which it becomes a predetermined optical magnification for the light of wavelengths $\lambda 2$ and $\lambda 3$, and it corrects chromatic aberration to the light of the wavelength $\lambda 2$. For that, 2 diffractive structures are necessary.

Further, in such a structure, when the first diffractive structure includes plural ring shaped diffractive zones concentrically provided around an optical axis of the second divergent angle-converting element, and has a cross-section shape of a saw-tooth structure, it is further preferable that d1, which is a height in an optical axis direction of a step between each of the ring shaped diffractive zones of the first diffractive structure satisfies the following formula:

$$0.9 \times \lambda 2/(n2-1) \leq d1 \leq 1.5 \times \lambda 3/(n3-1)$$

and also, when the first diffractive structure is a superposed diffractive structure having plural ring shaped zones concentrically provided around an optical axis of the second divergent angle-converting element, and each of the ring shaped zones further includes plural concentric stair-like structures thereon, it is preferable that d1, which is a height in an optical axis direction of a step between each of the concentric stair-like structures of the first diffractive structure satisfies the following relation.

$$0.9 \times \lambda 2/(n2-1) \leq d1 \leq 1.5 \times \lambda 3/(n3-1)$$

Further, when the second diffractive structure includes plural ring shaped diffractive zones concentrically provided around an optical axis of the second divergent angle-converting element, and has a cross-section shape of a saw-tooth structure, it is preferable that d2, which is a height in an optical axis direction of a step between each of the ring shaped diffractive zones of the second diffractive structure satisfies at least one of the following formulas:

$$1.4 \times \lambda 2/(n2-1) \leq d2 \leq 1.8 \times \lambda 2/(n2-1)$$

$$0.9 \times \lambda 2/(n2-1) \leq d2 \leq 1.1 \times \lambda 2/(n2-1)$$

$$0.9 \times \lambda 3/(n3-1) \leq d2 \leq 1.1 \times \lambda 3/(n3-1)$$

And also, when the second diffractive structure is a superposed diffractive structure having plural ring shaped zones concentrically provided around an optical axis of the second divergent angle-converting element, and each of the ring shaped zones further includes plural concentric stair-like structures thereon, it is preferable that d2, which is a height in an optical axis direction of a step between each of the concentric stair-like structures of the second diffractive structure satisfies at lease one of the following formulas:

$$1.4 \times \lambda 2/(n2-1) \leq d2 \leq 1.8 \times \lambda 2/(n2-1)$$

$$0.9 \times \lambda 2/(n2-1) \leq d2 \leq 1.1 \times \lambda 2/(n2-1)$$

$$0.9 \times \lambda 3/(n3-1) \leq d2 \leq 1.1 \times \lambda 3/(n3-1)$$

where n2 represents a refractive index of a material constituting the second divergent angle-converting element for a light having a wavelength of $\lambda 2$, and n3 represents a refractive index of a material constituting the second divergent angle-converting element for a light having a wavelength of $\lambda 3$.

Further, it is particularly preferable that the above d2 satisfies $$0.9 \times \lambda 2/(n2-1) \leq d2 < 1.1 \times \lambda 2/(n2-1).$$

Further, it is preferable that when a wavelength of a light flux, which is incident to the second divergent angle-converting element, varies to be longer, the second divergent angle-converting element makes a divergent angle of an outgoing light flux from the second divergent angle-converting element larger than a divergent angle before the wavelength variation.

According to the present invention, the light flux of the wavelength $\lambda 3$ is incident on the objective lens at a divergent angle larger than the wavelength $\lambda 2$, and the spherical aberrations of the both lights of wavelengths $\lambda 2$, $\lambda 3$ are corrected.

In the optical pick-up apparatus of the present invention, it is preferable that the first diffractive structure is formed on the optical surface of the light source side of the second divergent angle-converting element, and it is preferable that a first diffractive ray of the second light flux is generated by a diffraction effect of the first diffractive structure, and recording information on and/or reproducing information from the second optical information recording medium are conducted with an $n_{22}$-th order diffractive ray of the first diffractive ray of the second light flux, which is generated by a diffraction effect of the second diffractive structure, a first diffractive ray of the third light flux is generated by a diffraction effect of the first diffractive structure, and recording information on and/or reproducing information from the third optical information recording medium are conducted with an $n_{23}$-th order diffractive ray of the first diffractive ray of the third light flux, which is generated by a diffraction effect of the second diffractive structure, and a combination $(n_{22}, n_{23})$ of the $n_{22}$ and $n_{23}$ satisfies $(n_{22}, n_{23})=(2, 1), (0, 1)$, or $(1, 0)$.

According to the present invention, the second divergent angle-converting element can perform 2 roles in which it becomes a predetermined optical magnification to the light of wavelengths $\lambda 2$ and $\lambda 3$, and it corrects the chromatic aberration of the light of wavelength $\lambda 2$.

In the optical pick-up apparatus written in the present invention, it is further preferable that $(n_{22}, n_{23})=(0, 1)$ is satisfied, and an absolute value of the chromatic aberration, which the objective optical element possesses, is not more than 0.10 µm/nm to the light flux emitted from the first light source.

According to the present invention, in the objective lens, because the chromatic aberration is corrected for the light of the wavelength $\lambda 1$, the chromatic aberration remains for the light of the wavelength $\lambda 2$. On the one hand, because one diffractive structure is provided on the second divergent angle-converting element, it becomes a predetermined optical magnification for the light of wavelengths $\lambda 2$ and $\lambda 3$, however, the chromatic aberration remains for the light of wavelength $\lambda 2$. This remained chromatic aberration and the chromatic aberration of the objective lens are cancelled out, and in the entire optical system, the chromatic aberration is corrected for the light of wavelength $\lambda 2$.

In the optical pick-up apparatus written in the present invention, it is further preferable that the third diffractive structure is formed on at least one side optical surface of the collimator (the first divergent angle convergent element).

According to the present invention, when the chromatic aberration of wavelength $\lambda 1$ is generated in the objective lens, it can be corrected by the third diffractive structure of the collimator, and even when the chromatic aberration of itself is corrected by the objective lens, when the chromatic aberration of the collimator itself is corrected, the chromatic aberration can be corrected by the entire optical system.

It is further preferable that the collimator emits the divergent light when the wavelength of the first light flux incident on the collimator is shifted from $\lambda 1$ to the long wavelength side.

According to the present invention, the chromatic aberration remained in the objective lens can be corrected by the collimator.

Further, in the optical pick-up apparatus of the present invention, it is preferable that a value of the chromatic aberration which the objective optical element possesses, is within a range of −0.15 μm/nm to −0.6 μm/nm to the light flux emitted from the first light source.

It is also preferable that the diffractive structure is provided on at least one optical surface of optical surfaces of the objective lens.

According to the present invention, in the objective lens, the chromatic aberration of the objective lens is remained for both lights of wavelengths λ2, λ3. On the one hand, because one diffractive structure is provided in the second divergent angle-converting element, a predetermined optical magnification is obtained for the lights of wavelengths λ2 and λ3, however, for the light of wavelength λ2, the chromatic aberration is remained. This remained chromatic aberration and the chromatic aberration of the objective lens are cancelled out, and the chromatic aberration is corrected for the light of wavelength λ2 in the entire optical system.

Furthermore, in the optical pick-up apparatus of the present invention, it is preferable that, in the diffractive ray generated when the third light flux is subjected to the diffractive effect from the objective optical element, the diffraction efficiency E3 of the diffraction light having the maximum diffraction efficiency, satisfies 30%≦E3≦60%.

According to the present invention, even when the wavelength λ3 is about 2 times to the wavelength λ1, because different diffractive effects can be given to both lights, they can be used for compatibility.

In the optical pick-up apparatus of the present invention, it is preferable that the first light flux is incident on the objective optical element as the parallel light.

According to the present invention, in the high density optical disk in which the generated aberration is large to the error because the wavelength is shortest and NA is large, when it is structured in such a manner that the parallel light is incident on the objective lens, the adjustment of the pick-up is easily conducted, and even when the error is generated, the generated aberration can be suppressed.

In the optical pick-up apparatus of the present invention, it is preferable that the second light source and the third light source are a packaged light source unit.

According to the present invention, the downsizing of the pick-up apparatus can be intended. In the optical pick-up apparatus of the present invention, it is preferable that the objective optical element is formed of plastic. According to the present invention, the pick-up apparatus becomes a light weight and a low cost. Further, a burden of the actuator is reduced, resulting in power saving.

In the optical pick-up apparatus of the present invention, it is preferable that a beam shaper is provided between the first light source and the collimator.

According to the present invention, the light projected from the laser can be used without any loss, resulting in the long life acceleration of the laser, and power saving. In the optical pick-up apparatus of the present invention, it is preferable that the second divergent angle-converting element projects the second light flux as the parallel light.

According to the present invention, when it is structured in such a manner that the parallel light is incident on the objective lens, in the high density optical disk in which the generated aberration is large to the error because the wavelength is short and NA is also large, the adjustment of the pick-up is easily conducted, and even when the error is generated, the aberration generation amount can be controlled.

In the optical pick-up apparatus of the present invention, it is preferable that the second divergent angle-converting element is made of plastic. According to the present invention, the pick-up apparatus becomes a light weight and a low cost.

In the optical pick-up apparatus of the present invention, it is preferable that the optical pick-up apparatus has a beam splitter for making optical paths of the first light flux, second light flux, and third light flux coincident with each other, and the optical surface of the objective optical element is structured of the refractive surface, and at the time of use of the optical pick-up apparatus, the first divergent angle-converting element has a first diffractive structure by which the chromatic aberration of the first light converging spot formed on the first optical information recording medium when the wavelength of the first light flux emitted from the first light source is varied from λ1, is controlled within a range necessary for reproducing and/or recording of the information, and the second divergent angle-converting element has the second diffractive structure which makes divergent angles of both of the second light flux and third light flux to be smaller than at an incident time point, and makes the divergent angle of the second light flux to be smaller than the divergent angle of the third light flux, and projects it.

According to the present invention, because the objective lens is a refractive lens, the chromatic aberration remains for the light of the wavelength λ1. The chromatic aberration can be effectively corrected by the first diffractive structure formed in the first divergent angle-converting element. Further, for the lights of wavelengths λ2 and λ3, because the light can be made incident on the objective lens at an angle adjusted to the optical magnification of the objective lens, the compatibility of the wavelengths λ2 with λ3 can be attained.

In the optical pick-up apparatus of the present invention, it is preferable that the second divergent angle-converting element emits the second light flux as the parallel light, and emits the third light flux as the diverging light, and further, it is one of preferable modes that the first divergent angle-converting element emits the first light flux as the converging light.

According to the present invention, because the Objective lens is a refractive lens, the compatibility can be attained for 3 wavelengths.

Further, as compared to the case where the first light flux is emitted as the parallel light, the finite magnification of the third light flux is decreased.

Accordingly, the coma generated at the time of tracking can be decreased.

In the optical pick-up apparatus of the present invention, it is also a preferable mode that the second divergent angle-converting element emits both of the second light flux and the third light flux as the diverging light, further, it is also one of preferable modes that the first divergent angle-converting element emits the first light flux as the parallel light.

According to the present invention, because the objective lens is a refractive lens, the compatibility can be attained for 3 wavelengths. When it is structured in such a manner that the parallel light is incident on the objective lens in the high density optical disk in which the generated aberration is large to the error because the wavelength is shortest and NA is also large, the adjustment of the pick-up is easily conducted, and even when the error is generated, the aberration generation amount can be controlled.

Further, in the optical pick-up apparatus of the present invention, it is also preferable that the second divergent angle-converting element emits the second light flux as the converging light, and emits the third light flux as the diverging light, further, it is also one of preferable modes that the first divergent angle-converting element emits the first light flux as the parallel light.

In the optical pick-up apparatus of the present invention, it is one of preferable modes that the thickness t1 mm of the first protective substrate satisfies $0.5 \leq t1 \leq 0.7$.

According to the present invention, because the difference among t1, t2, t3 is small, when the optical magnification of the objective lens is 0 to the light of wavelength λ1, the optical magnification to the other light also comes near zero. Because the light incident on the objective lens approaches the infinite parallel light, even when the objective lens shifts in the perpendicular direction to the optical axis like as at the time of tracking, the aberration deterioration becomes small.

Further, in the optical pick-up apparatus of the present invention, it is also one of preferable modes that the thickness t1 mm of the first protective substrate satisfies $$0.08 \leq t1 \leq 0.12.$$

According to the present invention, the difference among t1, t2, t3 is large, and the difference between the optical magnifications of the objective lens also becomes large, and to the light of wavelength λ3 in which the distance between the objective lens and the information recording medium is short because the information recording medium is thick, the distance can be lengthened.

In the optical pick-up apparatus of the present invention, it is preferable that the optical pick-up apparatus is provided with a beam expander in the optical path of the first light flux. According to the present invention, the spherical aberration generated due to the temperature change or the wavelength change by the individual difference of the laser, in the high density optical disk in which the generated aberration is large to the error because the wavelength is shortest and NA is also large, can also be actively corrected.

In the divergent angle-converting element which is the second structure of the present invention, it is preferable that t1=t2.

According to the present invention, for the light of wavelength λ1 and λ2, because it is allowable when the spherical aberration generated by a case where only wavelength is different, is corrected, even when these two compatibility is conducted by the diffractive structure of the objective lens, the chromatic spherical aberration of the diffraction can be decreased.

In the divergent angle-converting element of the present invention, it is preferable that $-\frac{1}{50} \leq m2 \leq \frac{1}{50}, \frac{1}{10} \leq m3 \leq \frac{1}{4}$ are satisfied.

According to the present invention, because the light of wavelength λ2 and λ3 is incident on the objective lens at an appropriate angle, the recording and reproducing of the second optical information recording medium and the third optical information recording medium can be conducted.

In the divergent angle-converting element of the present invention, it is preferable that the first diffractive structure is provided on at least one optical surface of the divergent angle-converting element.

According to the present invention, because the diffractive structure can give the diffractive effect depending on the wavelength, it is a structure appropriate for the divergent angle-converting element which makes difference of the optical magnification corresponding to the wavelength in this manner.

In the divergent angle-converting element of the present invention, it is preferable that the first diffractive structure includes plural ring shaped diffractive zones concentrically provided around an optical axis of the divergent angle-converting element, and has a cross-section shape of a saw-tooth structure.

According to the present invention, the first diffractive structure is a structure by which the diffraction efficiency of a specific diffraction order is increased as in the manner of the blaze type diffractive structure, and is optimum as a structure formed on the optical element through which the light requiring the light amount as in the recording and reproducing of the optical disk, passes.

In the divergent angle-converting element of the present invention, it is further preferable that the optical pick-up apparatus conducts the reproducing and/or recording of the information on the second optical information recording medium by the first-order diffraction light of the second light flux generated by subjecting to the diffractive effect from the first diffractive structure, and conducts the reproducing and/or recording of the information on the third optical information recording medium by the first-order diffraction light of the third light flux generated by subjecting to the diffractive effect from the first diffractive structure.

According to the present invention, the diffraction efficiency can be increased for both of light of wavelengths λ2 and λ3.

In the divergent angle-converting element of the present invention, it is also one of preferable modes that the first diffractive structure is a superposed diffractive structure having plural ring shaped zones concentrically provided around an optical axis of the divergent angle-converting element, and each of the ring shaped zones further includes plural concentric stair-like structures thereon.

According to the present invention, in the light of wavelengths λ2 and λ3, one light is diffracted and the other light can be transmitted, and the diffractive effect can be selectively given.

Further, in the divergent angle-converting element, it is further preferable that, the second diffractive structure is provided on the optical surface on which the first diffractive structure is not provided, in the optical surfaces of the divergent angle-converting element.

According to the present invention, when 2 diffractive structures are provided rather than 1 structure, the degree of freedom can be increased. The second divergent angle-converting element performs 2 roles in one of which it becomes a predetermined optical magnification for the light of wavelengths λ2 and λ3, and in the other one of which it gives the color correction action to the light of wavelength λ2. For that, 2 diffractive structures at the maximum, are necessary.

In the divergent angle-converting element of the present invention, it is preferable that the divergent angle-converting element makes the projecting angle when the wavelength of the incident light flux is changed to the long wavelength side, large to the projecting angle before the wavelength of the incident light flux is changed to the long wavelength side. According to the present invention, the light flux of the wavelength λ3 is incident on the objective lens at a larger divergent angle than that of wavelength λ2, and the spherical aberrations of both lights of wavelengths λ2 and λ3 are corrected.

In the divergent angle-converting element of the present invention, it is preferable that the first diffractive structure is formed on the optical surface on the light source side of the divergent angle-converting element, and the first-order diffraction light of the second light flux generated by subjecting to the diffractive effect from the first diffractive structure conducts the reproducing and/or recording of the information on the second optical information recording medium by using the $n_{22}$-order diffraction light of the second light flux generated by subjecting to the diffractive effect from the second diffractive structure, and the first-order diffraction light of the third light flux generated by subjecting to the diffractive effect from the first diffractive structure conducts the reproducing and/or recording of the information on the third optical information recording medium by using the $n_{23}$-order diffraction light of the third light flux generated by subjecting to the diffractive effect from the second diffractive structure, and a combination of the $n_{22\ and\ n23}$ ($n_{22}$, $n_{23}$) satisfies ($n_{22}$, $n_{23}$)=(2, 1), (0, 1) or (1, 0).

According to the present invention, the second divergent angle-converting element can perform 2 roles in which it becomes a predetermined optical magnification for the light of wavelengths λ2 and λ3, and it gives the color correction action to the light of wavelength λ2.

In the divergent angle-converting element of the present invention, it is preferable that it projects the second light flux as the parallel light.

According to the present invention, as compared to a case where the first light flux is projected as the parallel light, the finite magnification of the third light flux becomes small. Therefore, the coma generated at the time of tracking can be reduced.

Further, it is preferable that the divergent angle-converting element of the present invention is formed of plastic. According to the present invention, the pick-up apparatus becomes light weight and low cost.

PREFERRED EMBODIMENTS OF THE INVENTION

Referring to the drawings, the first embodiment for carrying out the present invention will be detailed below. FIG. 1 is a view schematically showing a structure of the first pick-up apparatus PU1 which can appropriately conduct the recording/reproducing of the information for any one of AOD (the first optical information recording medium), DVD (the second optical information recording medium) and CD (the third optical information recording medium). The optical specification of AOD is, wavelength λ1=407 nm, the thickness t1 of protective layer PL1=0.6 mm, numerical aperture NA1=0.65, the optical specification of DVD is, wavelength λ2=655 nm, the thickness t2 of protective layer PL2=0.6 mm, numerical aperture NA2=0.65, and the optical specification of CD is, wavelength λ3=785 nm, the thickness t3 of protective layer PL3=1.2 mm, and numerical aperture NA3=0.51. However, the combination of the wavelength, thickness of protective layer, and numerical aperture is not limited to that. Further, as the first optical information recording medium, a high density optical disk whose thickness t1 of the protective layer PL1 is about 0.1 mm, may also be used.

The optical pick-up apparatus PU1 is structured by: a blue violet semiconductor laser LD1 (the first light source) which is light emitted when the recording/reproducing of the information is conducted on AOD, and projects the laser light flux (the first light flux) of wavelength 407 nm; a photo detector PD1 for the first light flux; a light source unit LU23 in which a red semiconductor laser LD2 (the second light source) which is light emitted when the recording/reproducing of the information is conducted on DVD, and projects the laser light flux (the second light flux) of wavelength 655 nm and an infrared semiconductor laser LD3 (the third light source) which is light emitted when the recording/reproducing of the information is conducted on CD, and projects the laser light flux (the third light flux) of wavelength 785 nm, are integrated; a photo detector PD23 common to the second light flux and the third light flux; a collimator L1 (the first divergent angle-converting element) through which only the first light flux passes; a second divergent angle-converting element L2 through which the second light flux and the third light flux pass, and on whose optical surface the first diffractive structure is formed; an objective lens (objective optical element) OBJ having a function by which each of laser light fluxes is converged on the information recording surfaces RL1, RL2, RL3; the first beam splitter BS1; the second beam splitter BS2; the third splitter BS3; a stop STO; and sensor lenses SEN1 and SEN2.

Hereupon, although a detailed description will be described later, a diffractive structure is provided also in the first correction element L1 and the objective lens OBJ.

In the optical pick-up apparatus PU1, when the recording/reproducing of the information is conducted on AOD, as the path of ray is drawn by a solid line in FIG. 1, initially, the blue violet semiconductor laser LD1 is light-emitted. The diverging light flux projected from the blue violet semiconductor laser LD1 passes through the first beam splitter BS2, and after it is converted into the parallel light flux when it transmits the first divergent angle-converting element L1, it passes through the second beam splitter BS2, and reaches the objective optical element OBJ. Then, a spot (the first light converging spot) is formed when the diffraction light of a predetermined order of the first light flux generated by subjecting to the diffractive effect from the diffractive structure of the objective optical element OBJ, is light converged on the information recording surface RL1 through the protective layer PL1 of AOD. In this first light converging spot, the chromatic aberration is controlled within a range necessary for reproducing and/or recording of the information, and specifically, an absolute value of the chromatic aberration of the first light converging spot is controlled to less than 0.15 μm/nm.

Then, the objective optical element OBJ conducts the focusing or tracking by 2-axis actuator AC (not shown) arranged in its periphery. The reflection light flux modulated by an information pit on the information recording surface RL1 passes again through the objective optical element OBJ, the second beam splitter BS2, and the first divergent angle-converting element L1, and is branched by the first beam splitter BS1, the astigmatism is given to it by the sensor lens, and is converged on the light receiving surface of the photo detector PD1. Then, by using the output signal of the photo detector PD1, the information recorded in AOD can be read.

Further, when the recording/reproducing of the information is conducted on DVD, as its path of ray is drawn by one dotted chain line in FIG. 1, initially, the red semiconductor laser LD2 is light-emitted. The diverging light flux projected from the red semiconductor laser LD2 passes through the third beam splitter BS3, when it transmits the second divergent angle-converting element L2, it is converted into the parallel light flux, and it is subjected to the diffractive effect by the first diffractive structure, and its first-order diffraction light is reflected by the second beam splitter BS2, and reaches the objective optical element OBJ.

Then, a spot (the second light converging spot) is formed when the diffraction light of a predetermined order of the second light flux generated by subjecting to the diffractive effect from the diffractive structure of the objective optical element OBJ is light-converged on the information recording surface RL2 through the protective layer PL2 of DVD. In this second light converging spot, the chromatic aberration is controlled within a range necessary for reproducing and/or recording of the information, and specifically, an absolute value of the chromatic aberration of the second light converging spot is controlled to less than 0.2 μm/nm.

Then, the objective optical element OBJ conducts the focusing or tracking by 2-axis actuator AC arranged in its periphery. The reflection light flux modulated by an information pit on the information recording surface RL2 passes again through the objective optical element OBJ, the second beam splitter BS2, the first divergent angle-converting element L2, and is branched by the third beam splitter BS3, and converged on the light receiving surface of the photo detector PD23. Then, by using the output signal of the photo detector PD23, the information recorded in DVD can be read.

Further, when the recording/reproducing of the information is conducted on CD, as its path of ray is drawn by a dotted line in FIG. 1, initially, the infrared semiconductor laser LD3 is light-emitted. The diverging light flux projected from the infrared semiconductor laser LD3 passes through the third beam splitter BS3, when it transmits the second divergent angle-converting element L2, it is converted into the parallel light flux, and is subjected to the diffractive effect by the first diffractive structure, and its first-order diffraction light is reflected by the second beam splitter BS2, and reaches the objective optical element OBJ.

Then, a spot (the second light converging spot) is formed when the diffraction light of n3-order (n3 is a natural number) of the third light flux generated by subjecting to the diffractive effect from the diffractive structure of the objective optical element OBJ is light-converged on the information recording surface RL3 through the protective layer PL3 of CD. In this third light converging spot, the chromatic aberration is controlled within a range necessary for reproducing and/or recording of the information.

Then, the objective optical element OBJ conducts the focusing or tracking by 2-axis actuator AC (not shown) arranged in its periphery. The reflection light flux modulated by an information pit on the information recording surface RL3 passes again through the objective optical element OBJ, the second beam splitter BS2, and the second divergent angle-converting element L2, and is branched by the third beam splitter BS3, and converged on the light receiving surface of the photo detector PD23. Then, by using the output signal of the photo-detector PD23, the information recorded in CD can be read.

Figure 2:
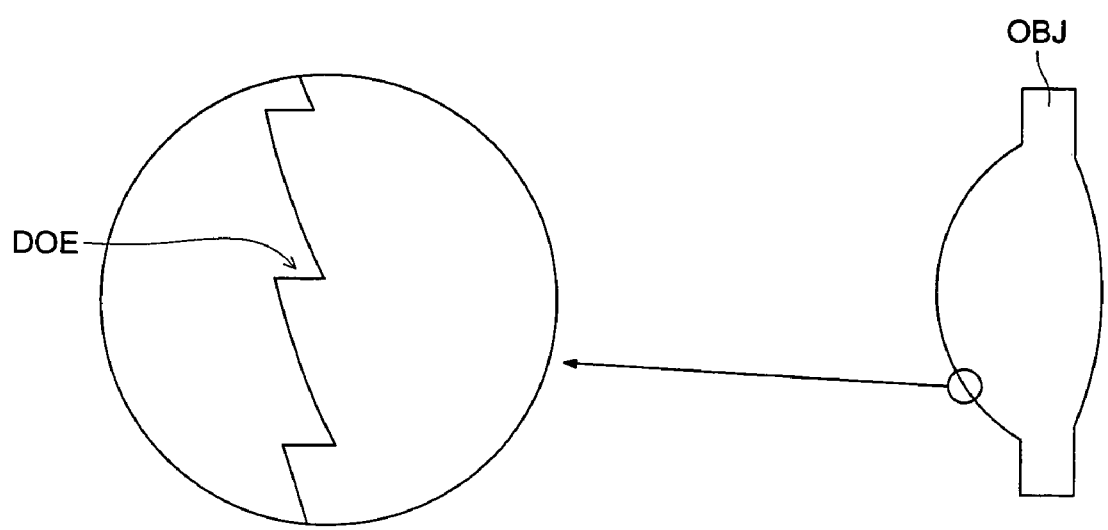
FIG. 2 is a sectional view of a main part showing the structure of an objective optical element.

The objective optical element OBJ is a plastic lens of a single lens whose both surfaces are aspheric, which has a function for light-converging the first-third light fluxes on the information recording surfaces RL1-RL3. Hereupon, it may also be allowable that the objective optical element is structured by combining a plurality of optical elements. On the incident surface of the objective optical element OBJ, a blaze type diffractive structure DOE as shown in FIG. 2 is formed. The blaze type diffractive structure DOE is provided for correcting the chromatic aberration which the objective optical element OBJ itself has for the light flux projected from the first light source, and specifically, it is designed so that an absolute value of the chromatic aberration is less than 2.1 μm/nm.

The first divergent angle-converting element L1 has a collimator function by which the first light flux projected from the first source LD1 as a diverging light is projected as the parallel light, and on its projecting surface, a blaze type diffractive structure DOE which is the same as shown in FIG. 2, is formed. This blaze type diffractive structure DOE is provided for correcting the chromatic aberration which the first divergent angle-converting element L1 itself has for the light flux projected from the first light source, and specifically, it is designed so that an absolute value of the chromatic aberration is less than 2.1 μm/nm.

In the second divergent angle-converting element L2, as the first diffractive structure, on its incident surface, a blaze type diffractive structure DOE which is the same structure as shown in FIG. 2, is formed. Then, the second divergent angle-converting element L2 has, by using the wavelength selectivity which the first diffractive structure has, a collimator function by which the second light flux projected from the second light source LD2 as the diverging light is projected as the parallel light, and a function by which the divergent angle of the third light flux projected from the third light source LD3 as the diverging light is converted into a smaller divergent angle, and projected, and the optical magnifications m2 and m3 for the light fluxes of wavelength λ2 and wavelength λ3 of the second divergent angle-converting element L2 can be made different values from each other.

Further, the distance T2 (mm) on the optical axis from the light emitting point of the second light source LD2 to the information recording surface RL2 of DVD, and the distance T3 (mm) on the optical axis from the light emitting point of the third light source LD3 to the information recording surface RL3 of CD, satisfy T2+0.6=T3. This is due to a reason why the thickness t3 (=1.2 mm) of the protective layer PL3 of CD is thicker than the thickness t2 (=0.6 mm) of the protective layer PL2 of DVD by 0.6 mm.

Hereupon, it is preferable that m2 and m3 are made within a range in which $-1/50 \leq m2 \leq 1/50$, $1/10 \leq m3 \leq 1/4$ are satisfied.

Figure 4:
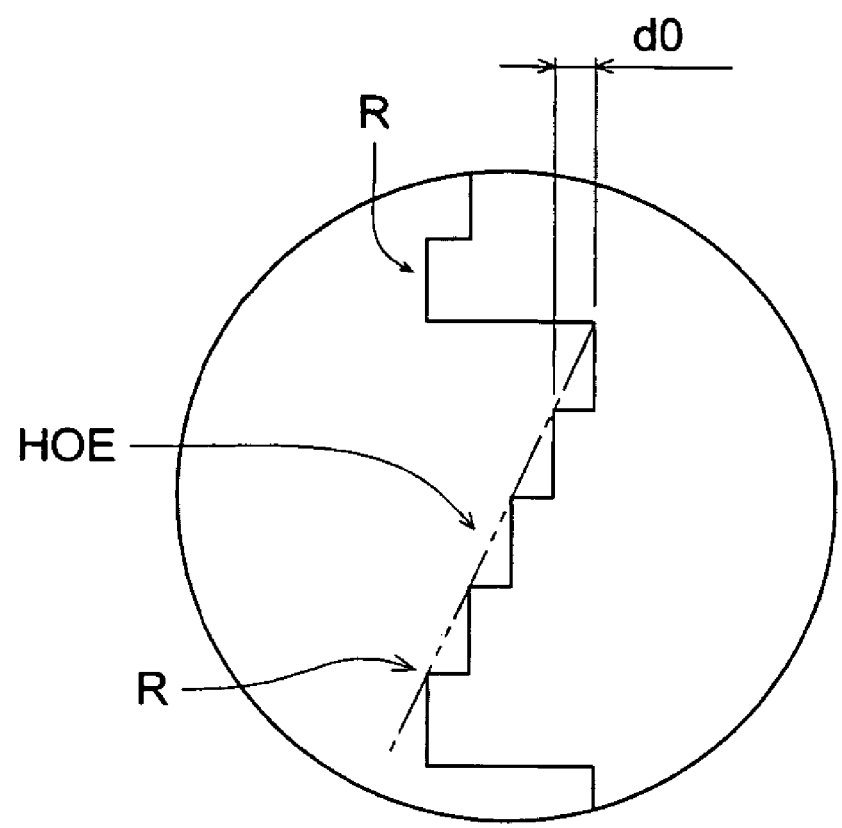
FIG. 4 is a sectional view of an Example of a superposed diffractive structure.

Hereupon, as the first diffractive structure of the second divergent angle-converting element L2 or the diffractive structure formed in the objective optical element OBJ and the first divergent angle-converting element L1, for example, as shown in FIG. 4, a superposition type diffractive structure which is a structure in which a plurality of ring-shaped zones inside of which a step structure is formed, are arranged around the optical axis, may also be used.

When a structure of a general superposition type diffractive structure and a design method are described, the depth d0 per-one step of the step structure formed in each ring-shaped zone R is set to a value calculated by $d0=k \times \lambda 1/(n1-1)$ (μm), and the division number N of each ring-shaped zone R is set to 5. However, λ1 is a wavelength of the laser light flux projected from the blue violet semiconductor laser expressed in the micron unit, (herein, λ1=0.408 μm), n1 is a refractive index for the wavelength λ1 of the first divergent angle-converting element L1 (herein, n1=1.5242).

On this superposition type diffractive structure HOE, when the laser light flux of the wavelength λ1 is incident, the optical path difference of k×λ1 (μm) is generated between adjoining steps, and because to the laser light flux of wavelength λ1, the phase difference is not practically given, it is not diffracted and transmits as it is. Hereupon, in the following description, the light flux to which the phase difference is not practically given by the superposition type diffractive structure and which transmits as it is, is called 0-order diffraction light.

For example, in the case where k=2, when, on this superposition type diffractive structure HOE, the laser light flux of wavelength λ2 (herein, λ2=0.658 μm) projected from the red semiconductor laser is incident, the optical path difference of $d0 \times (n2-1) - \lambda 2 = 0.13$ μm is generated between adjoining steps, and because, in one ring-shaped zone divided by 5, the optical path difference for one wavelength of the wavelength λ2 of 0.13×5=0.65 μm is generated, the wave-fronts which transmitted the adjoining ring-shaped zones R are superposed in such a manner that they are respectively shifted by one wavelength. That is, by this superposition type diffractive structure HOE, the light flux of wavelength λ2 becomes the diffraction light diffracted in the one-order direction. Hereupon, n2 is a refractive index (herein, n2=1.5064) for the wavelength λ2 of the second divergent angle-converting element L2. At this time, the diffraction efficiency of the one-order diffraction light of the laser light flux of the wavelength λ2 is 87.5%, and it is a sufficient light amount for recording/reproducing of the information on DVD.

When the superposition type diffractive structure HOE is formed on the objective optical element OBJ, by the action of the superposition type diffractive structure HOE, the spherical aberration due to the difference of wavelengths for AOD and DVD, can be corrected. When the thickness of the protective substrates are different as in BD and DVD, the spherical aberration due to the difference of the wavelengths and the thickness of the protective substrates can be corrected.

Further, on the superposition type diffractive structure HOE structured in this manner, when the laser light flux of wavelength λ3 (herein, λ3=0.785 μm) projected from the infrared semiconductor laser is incident, because λ3=2×λ1, the optical path difference of 1×λ3 (μm) is generated between adjoining steps, and because, in the same manner as the laser light flux of the wavelength λ1, to also the laser light flux of the wavelength λ3, the phase difference is not practically given, it is not diffracted and transmits as it is (0-order diffraction light).

When the superposition type diffractive structure HOE is formed in the objective optical element OBJ, in the objective optical element OBJ, when the magnifications for the wavelength λ1 and the wavelength λ3 are made different, the spherical aberration due to the difference of the thickness of the protective layers of AOD and CD, can be corrected.

Hereupon, in the present embodiment, because, through the first divergent angle-converting element L1, only the fist light flux passes, it is not necessary that the wavelength selectivity of the superposition type diffractive structure HOE is used, however, for example, when the first divergent angle-converting element L1 is positioned between the second beam splitter BS2 and the objective optical element OBJ, because, through the first correction element L1, the first—the third light flux pass, in this case, a structure in which the superposition type diffractive structure HOE is formed in the first correction element L1, and by using the wavelength selectivity of the superposition type diffractive structure HOE, in the first correction element, the diffractive effect is given only to the first light flux, and to the second light flux and the third light flux, the diffractive effect is not given, can be adopted.

Further, the above description is a description relating to a design method in the case where it is assumed that the first-the third light flux are incident on the superposition type diffractive structure HOE, and the wavelength selectivity for the 3 wavelengths of the first-the third light flux is given to the superposition type diffractive structure HOE, and based on this method, the wavelength selectivity for two wavelengths of the second light flux and the third light flux can be given to the first diffractive structure.

As described above, according to the divergent angle-converting element L2 and the optical pick-up apparatus PU1 shown in the present embodiment, when the second divergent angle-converting element L2 having the wavelength selectivity is arranged in the common optical path of the second light flux and the third light flux, the optical system from the light source to the objective lens for DVD and CD, can be made common.

Further, by using the light source unit in which the second light source LD2 and the third light source LD3 are integrated, when a structure by which the second light flux and the third light flux are made incident on the second divergent angle-converting element L2, is applied, a sufficient light amount and an aberration suppression function can be obtained in DVD and CD.

Hereupon, the second diffractive structure may also be provided on the optical surface on which the first diffractive structure is not provided, in optical surfaces of the second divergent angle-converting element L2.

In this case, it is preferable that the first-order diffraction light of the light flux of wavelength λ2 generated by subjecting to the diffractive effect from the first diffractive structure conducts the reproducing and/or recording of the information on DVD by using the $n_{22}$ ($n_{22}$ is a natural number)-order diffraction light of the light flux of the wavelength λ2 generated by subjecting to the diffractive effect from the second diffractive structure, and the first-order diffraction light of the light flux of wavelength λ3 generated by subjecting to the diffractive effect from the first diffractive structure conducts the reproducing and/or recording of the information on CD by using the $n_{23}$ ($n_{23}$ is a natural number)-order diffraction light of the light flux of the wavelength λ3 generated by subjecting to the diffractive effect from the second diffractive structure, and satisfies a combination of $n_{22}$ and $n_{23}$ ($n_{22}$, $n_{23}$)=(2, 1), (0, 1) or (1, 0). Further, it is preferable that it satisfies ($n_{22}$, $n_{23}$)=(0, 1), and an absolute value of the chromatic aberration which the objective optical element itself has, is less than 0.10 μm/nm to the light flux projected from the first light source. Further, it is preferable that the diffractive structure is provided on at least one optical surface of the first divergent angle-converting element L1, and the diverging light is projected when the wavelength of the incident light flux is shifted to a long wavelength side. In this case, it is preferable that a value of the chromatic aberration which the objective optical element itself has, is within a range of −0.5 μm/nm-−0.6 μm/nm to the light flux projected from the first light source.

Next, referring to the drawings, the second embodiment for carrying out the present invention will be described. Because also the second mode is the same as the first mode, the description will be made by using FIG. 1.

The optical pick-up apparatus PU is structured by: a blue violet semiconductor laser LD1 (the first light source) which is light-emitted when the recording/reproducing of the information is conducted on AOD, and projects the laser light flux (the first light flux) of wavelength 407 nm; a photo detector PD1 for the first light flux; a light source unit LU23 in which a red semiconductor laser LD2 (the second light source) which is light-emitted when the recording/reproducing of the information is conducted on DVD, and projects the laser light flux (the second light flux) of wavelength 655 nm, and an infrared semiconductor laser LD3 (the third light source) which is light-emitted when the recording/reproducing of the information is conducted on CD, and projects the laser light flux (the third light flux) of wavelength 785 nm, are integrated; a photo detector PD23 common to the second light flux and the third light flux; the first divergent angle-converting element L1 through which only the first light flux passes; the second divergent angle-converting element L2 through which the second light flux and the third light flux pass; an objective optical element OBJ having a function by which each laser light flux is light-converged on the information recording surfaces RL1, RL2, RL3; the first beam splitter BS1; the second beam splitter BS2; the third beam splitter BS3; a stop STO; sensor lenses SEN 1 and SEN 2.

Hereupon, although the detailed description will be made later, the first diffractive structure for correcting the chromatic aberration of the first light-converging spot on the information recording surface RL1 due to the wavelength variation is formed on the optical surface of the first divergent angle-converting element L1, and the second diffractive structure by which both the divergent angles of the second light flux and the third light flux are made smaller than at the incident time point, and the divergent angle of the second light flux is made smaller than the divergent angle of the third-light flux, and is projected, is formed on the optical surface of the second divergent angle-converting element L2. Further, on the optical surfaces of the objective optical element OBJ, the diffractive structure is not formed, and the optical surface is composed of a refractive surface.

In the optical pick-up apparatus, when the recording/reproducing of the information is conducted on AOD, as its path of ray is shown by a solid line in FIG. 1, initially, the blue violet semiconductor laser LD1 is light-emitted. The divergent light flux projected from the blue violet semiconductor laser LD1 passes through the first beam splitter BS1, and reaches the first divergent angle-converting element L1.

Then, the diffraction light of a predetermined order of the first light flux generated by subjecting to the diffractive effect from the first diffractive structure when it transmits the first divergent angle-converting element L1 is converted into the parallel light, transmits the second beam splitter BS2, and reaches the objective optical element OBJ.

Then, the refractive action is given to it on the refractive surface of the objective optical element OBJ, and a spot (the first light-converging spot) is formed when the first light flux is light-converged on the information recording surface RL1 through the protective layer PL1 of AOD.

Then, the objective optical element OBJ conducts the focusing or tracking by 2-axis actuator AC (not shown) arranged in its periphery. The reflection light flux modulated by an information pit on the information recording surface, RL1 passes again through the objective optical element OBJ, the second beam splitter BS2, and the first divergent angle-converting element L1, and is branched by the first beam splitter BS1, and the astigmatism is given by the sensor lens SEN1 and it is converged on the light receiving surface of the photo detector PD1. Then, by using the output signal of the photo detector PD1, the information recorded in AOD can be read.

Herein, when the recording/reproducing of the information is conducted on AOD, for example, even when, by an influence such as the wavelength change of the blue violet semiconductor laser LD1, the thickness error of the protective layer PL1, the focus jump between information recording surfaces of 2-layer disk, the environmental temperature change or the refractive index change of the objective optical element OBJ following the heat generation of 2-axis actuator AC2, the spherical aberration of the first light-converging spot on the information recording surface RL1 is changed to the over correction direction or under correction direction, the first diffractive structure is designed so that the chromatic aberration of the first light-converging spot can be controlled within a range necessary for the reproducing and/or recording of the information. Specifically, the first diffractive structure is designed so that an absolute value of the chromatic aberration of the first light-converging spot is less than 0.15 μm/nm.

Further, when the recording/reproducing of the information is conducted on DVD, as its path of ray is drawn by one dotted chain line in FIG. 1, initially, the red semiconductor laser LD2 is light-emitted. The diverging light flux projected from the red semiconductor laser LD2 passes through the third beam splitter BS3, and reaches the second divergent angle-converting element L2.

Then, when it transmits the second divergent angle-converting element L2, the diffraction light of a predetermined-order of the second light flux generated by subjecting to the diffractive effect from the second diffractive structure is converted into the parallel light flux, and it is reflected by the second beam splitter BS2, and reaches the objective optical element OBJ. Then, a spot (the second light converging spot) is formed when the refractive action is given to it on the refractive surface of the objective optical element OBJ, and the second light flux is light-converged on the information recording surface RL2 through the protective layer PL2 of DVD.

Then, the objective optical element OBJ conducts the focusing or tracking by 2-axis actuator AC arranged in its periphery. The reflection light flux modulated by an information pit on the information recording surface RL2 passes again through the objective optical element OBJ, the second beam splitter BS2, and the second divergent angle-converting element L2, and is branched by the third beam splitter BS3, and it is converged on the light receiving surface of the photo detector PD23. Then, by using the output signal of the photo detector PD23, the information recorded in DVD can be read.

Generally, because the objective optical element OBJ is optimized for the AOD, when the second light flux is incident on the objective optical element OBJ, in the second light-converging spot on the information recording surface RL2 of DVD, the spherical aberration changes to the over correction direction by the influence of wavelength dispersion of the objective optical element OBJ. Accordingly, in the present embodiment, the second diffractive structure is designed so that this spherical aberration change is corrected when the recording/reproducing of the information is conducted on DVD. Specifically, the second diffractive structure is designed so that an absolute value of the chromatic aberration of the second light-converging spot is less than 0.25 μm/nm.

Further, when the recording/reproducing of the information is performed on CD, as its path of ray is drawn by a dotted line in FIG. 1, initially, the infrared semiconductor laser LD3 is light-emitted. The diverging light flux projected from the infrared semiconductor laser LD3 passes through the third beam splitter BS3, and reaches the second divergent angle-converting element L2.

Then, the diffraction light of a predetermined order of the third light flux generated by subjecting to the diffractive effect by the second diffractive structure when it transmits the second divergent angle-converting element L2, is converted into the divergent angle smaller than the divergent angle at the time of the incident time point, and is projected from the second divergent angle-converting element L2. However, it is structured in such a manner that the divergent angle of the second light flux projected from the second divergent angle-converting element L2 is smaller than the divergent angle of the third light flux projected from the second divergent angle-converting element L2.

The third light flux projected as the diverging light from the second divergent angle-converting element L2 is reflected by the second beam splitter BS2, and reaches the objective optical element OBJ.

Then, when the refractive action is given to it on the refractive surface of the objective optical element OBJ and the third light flux is light-converged on the information recording surface RL3 through the protective layer PL3 of CD, the spot (the third light-converging spot) is formed. In this third light-converging spot, the chromatic aberration is controlled within a range necessary for reproducing and/or recording of the information.

Then, the objective optical element OBJ performs the focusing or tracking by 2-axis actuator AC arranged in its periphery. The reflection light flux modulated by an information pit on the information recording surface RL3 passes again through the objective optical element OBJ, the second beam splitter BS2, and the second divergent angle-converting element L2, and is branched by the third beam splitter BS3, and it is converged on the light receiving surface of the photo detector PD23. Then, by using the output signal of the photo detector PD23, the information recorded in CD can be read.

Figure 3:
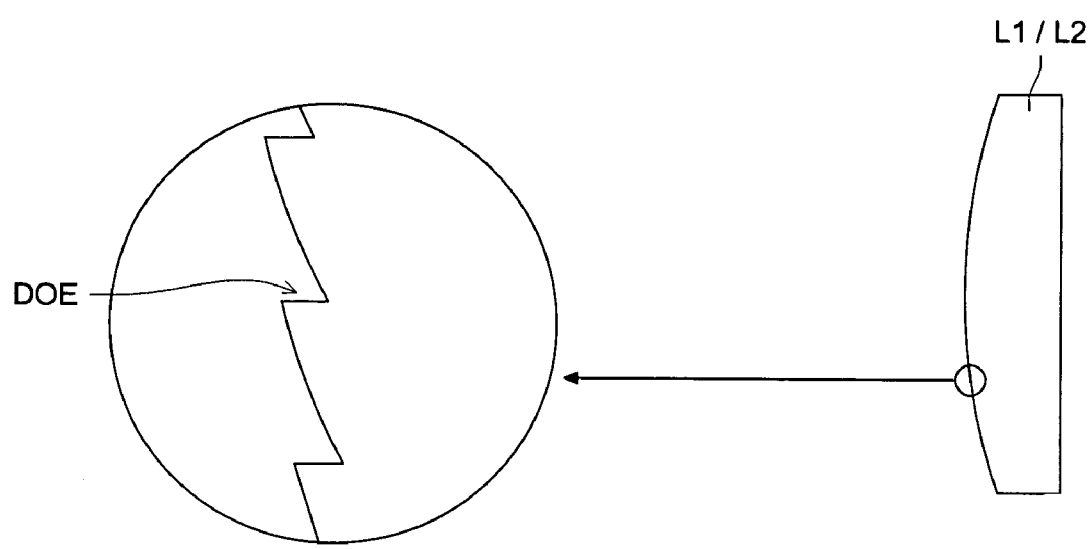
FIG. 3 is a sectional view of the main part showing the structure of the objective optical element.

Generally, because the objective optical element OBJ is optimized for the AOD, when the third light flux is incident on the objective optical element OBJ, in the third light-converging spot on the information recording surface RL3 of CD, the spherical aberration changes to the over correction direction by the influence of wavelength dispersion of the objective optical element OBJ, and by the influence of the difference of the thickness between protective layer PL1 of AOD and protective layer PL3 of CD. Accordingly, in the present embodiment, the second diffractive structure is designed so that this spherical aberration change is corrected when the recording/reproducing of the information is conducted on CD. As the first diffractive structure and the second diffractive structure, for example, a blaze type diffractive structure DOE as shown in FIG. 3, or a super position type diffractive structure HOE which is a structure in which a plurality of ring-shaped zones R inside of which a step structure is formed, are arranged around the optical axis, is listed.

Relating to the structure and design method of the super position type diffractive structure HOE, it is the same as the above-described first embodiment.

As described above, in the optical pick-up apparatus PU shown in the present embodiment, when the diffractive effect is given only to the first light flux by using the first diffractive structure, and the diffractive effect is given only to the second light flux and the third light flux by using the second diffractive structure, even when it is a structure in which the diffractive structure is not provided in the objective optical element OBJ, an optical pick-up apparatus for compatibility with the high density optical disk/DVD/CD which has the security of an enough light amount and an aberration correction performance, can be obtained.

Further, when the light source unit LU23 in which the second light source LD2 and the third light source LD3 are packaged is used, the optical element composing the optical system of the optical pick-up apparatus PU can be in common with the second light flux and the third light flux, and the size reduction of the optical pick-up apparatus PU or the reduction of number of parts can be realized.

Hereupon, in the present embodiment, a structure in which the second divergent angle-converting element L2 projects the light flux of wavelength $\lambda 2$ as the parallel light, and projects the light flux of wavelength $\lambda 3$ as the diverging light, is applied, however, the structure is not limited to this, a structure in which the second divergent angle-converting element L2 projects both the light fluxes of wavelength $\lambda 2$ and wavelength $\lambda 3$ as the diverging light, or projects the light flux of wavelength $\lambda 2$ as the diverging light, and projects the light flux of wavelength $\lambda 3$ as the diverging light, may also be applied. Further, a structure in which the first divergent angle-converting element L1 projects the light flux wavelength $\lambda 1$ as the converging light, may also be applied.

EXAMPLES

Example 1

Next, the first example of the optical pick-up apparatus, the first divergent angle-converting element and the second divergent angel-converting element L2, shown in the above embodiment, will be described. Lens data of each optical element will be shown in Table 1 and Table 2.

TABLE 1

Example 1 lens data
Focal distance of the objective lens: $f_1$ = 3.1 mm, $f_2$ = 3.19 mm, $f_3$ = 3.16 mm
Image surface side numerical aperture: NA1: 0.65, NA2: 0.65, NA3: 0.51

| i-th surface | ri | di (407 nm) | ni (407 nm) | i-th surface | ri | di (655 nm) | ni (655 nm) | di (785 nm) | ni (785 nm) |
|---|---|---|---|---|---|---|---|---|---|
| 0 | | 14.042794 | | 0 | | 14.034839 | | 14.034839 | |
| 1 | infinity | 6.25 | 1.52992 | 1 | infinity | 6.25 | 1.514362 | 6.25 | |
| 2 | infinity | 1 | 1.0 | 2 | infinity | 1 | 1.0 | 1 | 1.51108 |
| 3 | 114.32953 | 1.5 | 1.559806 | 3 | −113.72283 | 1.5 | 1.540725 | 1.5 | 1.0 |
| 4 | −13.92829 | 5 | 1.0 | 4 | −7.74527 | 5 | 1.0 | 5 | 1.537237 |
| 5 | ∞ | 0.1 | | | | 0.1 | | 0.1 | 1.0 |
| (stop diameter) | | (φ4.14 mm) | | | | (φ4.15 mm) | | (φ3.32 mm) | |
| 6 | 2.03647 | 1.73000 | 1.559806 | | | 1.73000 | 1.540725 | 1.73000 | 1.537237 |
| 7 | −13.53737 | 1.71 | 1.0 | | | 1.78 | 1.0 | 1.47 | 1.0 |
| 8 | ∞ | 0.6 | 1.61869 | | | 0.6 | 1.57752 | 1.2 | 1.57063 |
| 9 | ∞ | | | | | | | | |

*di expresses a displacement from the i-th surface to the (i + 1)-th surface.

TABLE 2

Aspheric surface data
The first divergent angle-converting element
The 3rd surface
    Aspheric surface coefficient
        κ −6.6436 × E−1
The 4th surface (HD-DVD: 1st-order blazed wavelength 1 mm)
    Aspheric surface coefficient
        κ −8.3465 × E−1
    Optical path difference function
        C2 −6.2961 × E−0
        C4 −1.5298 × E−2
The second divergent angle-converting element
The 3rd surface (DVD: 2nd-order CD: 1st-order blazed
wavelength 1 mm)
    Aspheric surface coefficient
        κ −1.0000 × E+3
    Optical path difference function
        C2 −2.4248 × E+0
        C4 +6.2330 × E−4
The 4th surface (DVD: 1st-order, CD: 1st-order blazed
wavelength 1 mm)
    Aspheric surface coefficient
        κ −4.7604 × E−1
    Optical path difference function
        C2 +2.0944 × E+1
        C4 +1.2308 × E−1
Objective lens
The 6-th surface (AOD: 3rd-order, DVD: 2nd-order, CD: 2nd-order, HD-DVD: 1st-order blazed wavelength 1 mm)
    Aspheric surface coefficient
        κ −4.4715 × E−1
        A2 −7.2396 × E−4
        A4 −1.3187 × E−3
        A6 +5.4370 × E−4
        A8 −1.0983 × E−4
        A10 +8.5286 × E−6
        A12 −1.3509 × E−6
    Optical path difference function
        C2 −8.1308 × E−0
        C4 −4.6175 × E−1
        C6 −2.8616 × E−1
        C8 +6.6346 × E−2
        C10 −7.9277 × E−3
The 7th surface
    Aspheric surface coefficient
        κ −4.1355 × E+2
        A2 −9.4311 × E−3
        A4 +1.1572 × E−2
        A6 −5.3553 × E−3
        A8 +1.2651 × E−3
        A10 −1.5851 × E−4
        A12 +8.2943 × E−6

As shown in FIG. 1, the objective lens of the present embodiment is set to the focal distance, when the wavelength λ1=407 nm, f1=3.1 mm, the image side numerical aperture NA1=0.65, and set to the focal distance, when the wavelength λ2=655 nm, f2=3.19 mm, the image side numerical aperture NA2=0.65, and set to the focal distance, when the wavelength λ3=785 nm, f3=3.16 mm, the image side numerical aperture NA3=0.51.

Further, in the present embodiment, the blazed type diffractive structure is formed on the projecting surface (the 4th surface) of the first divergent angle-converting element, the incident surface (the 3rd surface) and the projecting surface (the 4th surface), of the second divergent angle-converting element, and the incident surface (the 6th surface) of the objective optical element (objective lens).

Further, it is structured in such a manner that the magnifications m1, m2 to the first light flux and the second light flux are almost 0, the first light flux and the second light flux are incident on the objective lens as the parallel light, and the magnification m3 to the third light flux is negative, and the third light flux is incident on the objective lens as the diverging light.

The incident surface (the 3rd surface) and projecting surface (the 4th surface) of the first divergent angle-converting element, the incident surface (the 3rd surface) and projecting surface (the 4th surface) of the second divergent angle-converting element, and the incident surface (the 6th surface) and projecting surface (the 7th surface) of the objective optical element, are formed into the aspheric surface which is regulated by the equation in which coefficients shown in Table 1 and Table 2 are respectively substituted into the following expression (math-1), and which is axial symmetric around the optical axis L.

(Math-1)

Equation of Aspheric Surface Shape $$X(h) = \frac{(h^2/R)}{1+\sqrt{1-(1+\kappa)(h/R)^2}} + \sum_{i=0}^{9} +A_{2i}h^{2i}$$

Herein, X(h) is the axis in the optical axis direction (the advancing direction of the light is positive), κ is a conical coefficient, and $A_{2i}$ is an aspheric surface coefficient.

Further, a pitch of the diffraction ring-shaped zone is regulated by an equation into which coefficients shown in Table 2 are instituted.

(Math-2)

Optical Path Difference Function $$\Phi(h) = \left(\sum_{i=0}^{5} B_{2i}h^{2i}\right) \times n \times \lambda/\lambda B$$

Herein, B2i is a coefficient of the optical path difference function, λ is a wavelength to be used, and λB is a blazed wavelength of the diffraction (λB=1 mm).

Example 2

Next, the second example of the optical pick-up apparatus, and the first divergent angle-converting element and the second divergent angle-converting element, shown in the above embodiment, will be described.

The present example, as in the above first embodiment, relates to the optical pick-up apparatus in which, when both of the chromatic aberration of the objective optical element itself to the first light flux and the chromatic aberration of the first divergent angle-converting element itself are made almost zero, the chromatic aberration of the first light-converging spot at the time of use of the optical pick-up apparatus is controlled within a range necessary for the reproducing and/or recording of the information, further, when a positive chromatic aberration of the objective optical element itself to the second light flux, is cancelled out by a negative chromatic aberration of the second divergent angle-converting element itself, the chromatic aberration of the second light-converging spot at the time of use of the optical pick-up apparatus is controlled within a range necessary for the reproducing and/or recording of the information.

The lens data of each optical element is shown in Table 3 and Table 4.

TABLE 3

Example 2 lens data
Focal distance of the objective lens: $f_1 = 3.1$ mm, $f_2 = 3.16$ mm, $f_3 = 3.09$ mm
Image surface side numerical aperture: NA1: 0.65, NA2: 0.65, NA3: 0.51

| i-th surface | ri | di (407 nm) | ni (407 nm) | i-th surface | ri | di (655 nm) | ni (655 nm) | di (785 nm) | ni (785 nm) |
|---|---|---|---|---|---|---|---|---|---|
| 0 |  | 14.189265 |  | 0 |  | 14.253152 |  | 14.253152 |  |
| 1 | infinity | 6.25 | 1.52992 | 1 | infinity | 6.25 | 1.514362 | 6.25 |  |
| 2 | infinity | 1 | 1.0 | 2 | infinity | 1 | 1.0 | 1 | 1.51108 |
| 3 | 43.71519 | 1.5 | 1.559806 | 3 | 28.81402 | 1.5 | 1.540725 | 1.5 | 1.0 |
| 4 | −10.87889 | 5 | 1.0 | 4 | −6.96923 | 5 | 1.0 | 5 | 1.537237 |
| 5 (stop diameter) | ∞ | 0.1 (φ4.14 mm) |  |  |  | 0.1 (φ4.15 mm) |  | 0.1 (φ3.25 mm) |  |
| 6 | 2.15303 | 1.73000 | 1.559806 |  |  | 1.73000 | 1.540725 | 1.73000 | 1.537237 |
| 7 | −18.94537 | 1.69 | 1.0 |  |  | 1.73 | 1.0 | 1.36 | 1.0 |
| 8 | ∞ | 0.6 | 1.618689 |  |  | 0.6 | 1.57752 | 1.2 | 1.57063 |
| 9 | ∞ |  |  |  |  |  |  |  |  |

*di expresses a displacement from the i-th surface to the (i + 1)-th surface.

TABLE 4

Aspheric surface data
The first divergent angle-converting element
The 3rd surface
    Aspheric surface coefficient
        $\kappa$ −2.9816 × E+0
The 4th surface (HD-DVD: 1st-order blazed wavelength 1 mm)
    Aspheric surface coefficient
        $\kappa$ −6.6298 × E−1
        A2 +6.8060 × E−4
        A4 +4.2157 × E−7
    Optical path difference function
        C2 +1.6953 × E+1
        C4 +9.7909 × E−1
The second divergent angle-converting element
The 3rd surface
    Aspheric surface coefficient
        $\kappa$ −6.8225 × E−0
The 4th surface (DVD: 1st-order, CD: 1st-order blazed wavelength 1 mm)
    Aspheric surface coefficient
        $\kappa$ −8.8682 × E−1
    Optical path difference function
        C2 +3.4941 × E+1
        C4 +2.0110 × E−2
Objective lens
The 6-th surface (AOD: 3rd-order, DVD: 2nd-order, CD:2nd-order, blazed wavelength 1 mm)
    Aspheric surface coefficient
        $\kappa$ −4.3741 × E−1
        A2 +1.1713 × E−4
        A4 −1.2104 × E−3
        A6 +5.3927 × E−4
        A8 −1.1589 × E−4
        A10 +1.1395 × E−5
        A12 −1.3946 × E−6
    Optical path difference function
        C2 −1.7589 × E+1
        C4 −6.7834 × E−1
        C6 −2.1641 × E−1
        C8 +3.2057 × E−2
        C10 −3.4960 × E−3
The 7th surface
    Aspheric surface coefficient
        $\kappa$ −1.1243 × E+3
        A2 −7.9648 × E−3
        A4 +1.1269 × E−2
        A6 −5.3948 × E−3
        A8 +1.2875 × E−3
        A10 −1.6243 × E−4
        A12 +8.5641 × E−6

As shown in Table 3, the objective lens of the present example is set to the focal distance, when the wavelength $\lambda 1 = 407$ nm, $f1 = 3.1$ mm, the image side numerical aperture NA1=0.65, and set to the focal distance, when the wavelength $\lambda 2 = 655$ nm, $f2 = 3.16$ mm, the image side numerical aperture NA2=0.65, and set to the focal distance, when the wavelength $\lambda 3 = 785$ nm, $f3 = 3.09$ mm, the image side numerical aperture NA3=0.51.

Further, in the present example, the blazed type diffractive structure is formed on the projecting surface (the 4th surface) of the first divergent angle-converting element, the projecting surface (the 4th surface) of the second divergent angle-converting element, and the incident surface (the 6th surface) of the objective optical element(objective lens).

Further, it is structured in such a manner that the magnifications m1, m2 to the first light flux and the second light flux are almost 0, the first light flux and the second light flux are incident on the objective lens as the parallel light, and the magnification m3 to the third light flux is negative, and the third light flux is incident on the objective lens as the diverging light.

The incident surface (the 3rd surface) and projecting surface (the 4th surface) of the first divergent angle-converting element, the incident surface (the 3rd surface) and projecting surface (the 4th surface) of the second divergent angle-converting element, and the incident surface (the 6th surface) and projecting surface (the 7th surface) of the objective optical element, are formed into the aspheric surface which is regulated by the equation in which coefficients shown in Table 3 and Table 4 are respectively substituted into the above expression (math-1), and which is axial symmetric around the optical axis L.

Further, a pitch of the diffraction ring-shaped zone is regulated by an equation into which coefficients shown in Table 4 are instituted.

Example 3

Next, the third example of the optical pick-up apparatus, and the first divergent angle-converting element and the second divergent angle-converting element, shown in the above embodiment, will be described.

The present example, as in the above second embodiment, relates to the optical pick-up apparatus in which, when both of the chromatic aberration of the objective optical element itself to the second light flux and the chromatic aberration of the second divergent angle-converting element itself are made almost zero, the chromatic aberration of the second light-converging spot at the time of use of the optical pick-up apparatus is controlled within a range necessary for the reproducing and/or recording of the information, further, when a negative chromatic aberration of the objective optical element itself to the first light flux, is cancelled out by a positive chromatic aberration of the first divergent angle-converting element itself, the chromatic aberration of the first light-converging spot at the time of use of the optical pick-up apparatus is controlled within a range necessary for the reproducing and/or recording of the information.

The lens data of each optical element is shown in Table 5 and Table 6.

TABLE 5

Example 3 lens data
Focal distance of the objective lens: $f_1$ = 3.1 mm, $f_2$ = 3.21 mm, $f_3$ = 3.23 mm
Image surface side numerical aperture: NA1: 0.65, NA2: 0.65, NA3: 0.51
*di expresses a displacement from the i-th surface to the (i + 1)-th surface.

| i-th surface | ri | di (407 nm) | ni (407 nm) | i-th surface | ri | di (655 nm) | ni (655 nm) | di (785 nm) | ni (785 nm) |
|---|---|---|---|---|---|---|---|---|---|
| 0 | | 13.81389 | | 0 | | 13.89454 | | 13.89454 | |
| 1 | infinity | 6.25 | 1.52992 | 1 | infinity | 6.25 | 1.514362 | 6.25 | |
| 2 | infinity | 1 | 1.0 | 2 | infinity | 1 | 1.0 | 1 | 1.51108 |
| 3 | −73.50459 | 1.5 | 1.559806 | 3 | −2491.104 | 1.5 | 1.540725 | 1.5 | 1.0 |
| 4 | −19.48555 | 5 | 1.0 | 4 | −16.73854 | 5 | 1.0 | 5 | 1.537237 |
| 5 (stop diameter) | ∞ | 0.1 (φ4.14 mm) | | | | 0.1 (φ4.17 mm) | | 0.1 (φ3.36 mm) | 1.0 |
| 6 | 1.94790 | 1.73000 | 1.559806 | | | 1.73000 | 1.540725 | 1.73000 | 1.537237 |
| 7 | −10.83691 | 1.74 | 1.0 | | | 1.83 | 1.0 | 1.54 | 1.0 |
| 8 | ∞ | 0.6 | 1.618689 | | | 0.6 | 1.57752 | 1.2 | 1.57063 |
| 9 | ∞ | | | | | | | | |

*di expresses a displacement from the i-th surface to the (i + 1)-th surface.

TABLE 6

Aspheric surface data
The first divergent angle-converting element
The 3rd surface
  Aspheric surface coefficient
    κ −1.2865 × E−1
The 4th surface (HD-DVD: 1st-order blazed wavelength 1 mm)
  Aspheric surface coefficient
    κ −5.6016 × E−0
    A2 −1.2220 × E−4
    A4 −8.2772 × E−7
  Optical path difference function
    C2 −3.4973 × E+1
    C4 −3.1167 × E−1
The second divergent angle-converting element
The 3rd surface
  Aspheric surface coefficient
    κ +5.0000 × E−0
The 4th surface (DVD: 2nd-order, CD: 1st-order blazed wavelength 1 mm)
  Aspheric surface coefficient
    κ −3.0979 × E−1
  Optical path difference function
    C2 −6.8329 × E−0
    C4 −9.6489 × E−4
Objective lens
The 6-th surface (AOD: 3rd-order, DVD: 2nd-order, CD: 2nd-order, blazed wavelength 1 mm)
  Aspheric surface coefficient
    κ −4.6387 × E−1
    A2 −1.8195 × E−4
    A4 −1.9297 × E−3
    A6 +7.6730 × E−4
    A8 −1.4669 × E−4

TABLE 6-continued

A10 +4.2269 × E−6
    A12 −3.3768 × E−7
  Optical path difference function
    C2 0
    C4 −4.3190 × E−1
    C6 −2.3777 × E−1
    C8 +7.3114 × E−2
    C10 −1.0422 × E−2
The 7th surface
  Aspheric surface coefficient
    κ −2.8743 × E+2
    A2 −9.7882 × E−3

TABLE 6-continued

A4 +1.1311 × E−2
    A6 −5.3137 × E−3
    A8 +1.2888 × E−3
    A10 −1.6378 × E−4
    A12 +8.6619 × E−6

As shown in Table 5, the objective lens of the present example is set to the focal distance, when the wavelength λ1=407 nm, f1=3.1 mm, the image side numerical aperture NA1=0.65, and set to the focal distance, when the wavelength λ2=655 nm, f2=3.21 mm, the image side numerical aperture NA2=0.65, and set to the focal distance, when the wavelength λ3=785 nm, f3=3.23 mm, the image side numerical aperture NA3=0.51.

Further, in the present example, the blazed type diffractive structure is formed on the projecting surface (the 4th surface) of the first divergent angle-converting element, the projecting surface (the 4th surface) of the second divergent angle-converting element, and the incident surface (the 6th surface) of the objective optical element (objective lens).

Further, it is structured in such a manner that the magnifications m1, m2 to the first light flux and the second light flux are almost 0, the first light flux and the second light flux are incident on the objective lens as the parallel light, and the magnification m3 to the third light flux is negative, and the third light flux is incident on the objective lens as the diverging light.

The incident surface (the 3rd surface) and projecting surface (the 4th surface) of the first divergent angle-converting element, the incident surface (the 3rd surface) and projecting surface (the 4th surface) of the second divergent angle-converting element, and the incident surface (the 6th surface) and projecting surface (the 7th surface) of the objective optical element (objective lens), are formed into the aspheric surface which is regulated by the equation in which coefficients shown in Table 5 and Table 6 are respectively substituted into the above expression (math-1), and which is axial symmetric around the optical axis L.

Further, a pitch of the diffraction ring-shaped zone is regulated by an equation into which coefficients shown in Table 6 are instituted.

The table 7 shows, in examples 1-3, a chromatic aberration (written as AOD) in a case where the objective lens and the first divergent angle-converting element are combined, and a chromatic aberration (written as DVD) in a case where the objective lens and the second divergent angle-converting element are combined.

TABLE 7

Chromatic aberration (μm/nm) in the case where the objective lens and the first divergent angle-converting element or the second divergent angle-converting element are combined

|  | AOD | DVD |
|---|---|---|
| Example 1 | 0.04 | −0.02 |
| Example 2 | 0.04 | −0.01 |
| Example 3 | −0.01 | −0.19 |

From Table 7, in each example, it can be seen that the chromatic aberration is controlled within a range which does not practically interfere with the AOD and DVD.

EFFECTS OF THE INVENTION

According to the present invention, an optical pick-up apparatus which has compatibility with AOD, DVD and CD and in which the light amount securement and aberration correction stand together, and a divergent angle-converting element can be obtained.

What is claimed is:

1. An optical pickup apparatus, comprising:
a first light source emitting a first light flux having a wavelength of $\lambda 1$, which satisfies 380 nm$\leq\lambda 1\leq$450 nm, the first light source being utilized for recording information on and/or for reproducing information from a first optical information recording medium having a first protective substrate having a thickness of t1 on an information recording surface;
a second light source emitting a second light flux having a wavelength of $\lambda 2$, which satisfies 600 nm$\leq\lambda 2\leq$700 nm, the second light source being utilized for recording information on and/or for reproducing information from a second optical information recording medium having a second protective substrate having a thickness of t2, which satisfies t1$\leq$t2, on an information recording surface;
a third light source emitting a third light flux having a wavelength of $\lambda 3$, which satisfies 750 nm$\leq\lambda\leq$800 nm, the third light source being utilized for recording information on and/or for reproducing information from a third optical information recording medium having a third protective substrate having a thickness of t3, which satisfies t2<t3, on an information recording surface;
a first divergent angle-converting element, through which at least the first light flux passes;
a second divergent angle-converting element, through which at least the second light flux and the third light flux passes; and
an objective optical element, through which the first light flux, the second light flux and the third light flux pass,
wherein m2, which is an optical magnification of the second divergent angle-converting element for the second light flux, is different from m3, which is an optical magnification of the second divergent angle-converting element for the third light flux.

2. The optical pickup apparatus of claim 1, wherein the first divergent angle-converting element is a collimating lens.

3. The optical pickup apparatus of claim 2, wherein T2, which is a distance between a luminous point of the second light source and the information recording surface of the second optical information recording medium, and T3, which is a distance between a luminous point of the third light source and the information recording surface of the third optical information recording medium, satisfy the following equation.

$T2+0.6=T3$.

4. The optical pickup apparatus of claim 1, wherein the thickness t1 and the thickness t2 satisfy the following equation.

$t1=t2$.

5. The optical pickup apparatus of claim 1, wherein the optical magnification m2 and the optical magnification m3 satisfy the following formulas.

$-1/50 \leq m2 \leq 1/50$, $1/10 \leq m3 \leq 1-4$.

6. The optical pickup apparatus of claim 1, wherein a first diffractive structure is provided on a first optical surface of the second divergent angle-converting element.

7. The optical pickup apparatus of claim 6, wherein the first diffractive structure includes plural ring shaped diffractive zones concentrically provided around an optical axis of the second divergent angle-converting element, and has a cross-section shape of a saw-tooth structure.

8. The optical pickup apparatus of claim 7, wherein d1, which is a height in an optical axis direction of a step between each of the ring shaped diffractive zones, satisfies the following relation;

$0.9\times\lambda 2/(n2-1)\leq d1 \leq 1.5\times\lambda 3/(n3-1)$ where n2 represents a refractive index of a material constituting the second divergent angle-converting element for a light having a wavelength of $\lambda 2$, and n3 represents a refractive index of a material constituting the second divergent angle-converting element for a light having a wavelength of $\lambda 3$.

9. The optical pickup apparatus of claim 7, wherein recording information on and/or reproducing information from the second optical information recording medium are conducted with a first-order diffractive ray of the second light flux, which is generated by a diffraction effect of the first diffractive structure, and
wherein recording information on and/or reproducing information from the third optical information recording medium are conducted with a first-order diffractive ray of the third light flux, which is generated by a diffraction effect of the first diffractive structure.

10. The optical pickup apparatus of claim 6, wherein the first diffractive structure is a superposed diffractive structure having plural ring shaped zones concentrically provided around an optical axis of the second divergent angle-converting element, and each of the ring shaped zones further includes plural concentric stair-like structures thereon.

11. The optical pickup apparatus of claim 10, wherein d1, which is a height in an optical axis direction of a step between each of the concentric stair-like structures satisfies the following relation:

$$0.9 \times \lambda 2/(n2-1) \leq d1 \leq 1.5 \times \lambda 3/(n3-1)$$

where n2 represents a refractive index of a material constituting the second divergent angle-converting element for a light having a wavelength of $\lambda 2$, and n3 represents a refractive index of a material constituting the second divergent angle-converting element for a light having a wavelength of $\lambda 3$.

12. The optical pickup apparatus of claim 6, wherein when the optical pickup apparatus is operated, a chromatic aberration of a first converged spot, which is formed by the first light flux on the information recording surface of the first optical information recording medium, is controlled within a range necessary for recording information on and/or reproducing information from the second optical information recording medium, and a chromatic aberration of a second converged spot, which is formed by the second light flux on the information recording surface of the second optical information recording medium, is controlled within a range necessary for recording information on and/or reproducing information from the second optical information recording medium.

13. The optical pickup apparatus of claim 12, wherein the chromatic aberration of the first converged spot is controlled to not more than 0.15 μm/nm, and the chromatic aberration of the second converged spot is controlled to not more than 0.2 μm/nm.

14. The optical pickup apparatus of claim 6, wherein a second diffractive structure is provided on a second optical surface of the second divergent angle-converting element,
wherein the second optical surface is an optical surface other than the first optical surface.

15. The optical pickup apparatus of claim 14, wherein when a wavelength of a light flux, which is incident to the second divergent angle-converting element, varies to be longer, the second divergent angle-converting element makes a divergent angle of an outgoing light flux from the second divergent angle-converting element larger than a divergent angle before the wavelength variation.

16. The optical pickup apparatus of claim 14, wherein the first diffractive structure includes plural ring shaped diffractive zones concentrically provided around an optical axis of the second divergent angle-converting element, and has a cross-section shape of a saw-tooth structure,
wherein d1, which is a height in an optical axis direction of a step between each of the ring shaped diffractive zones of the first diffractive structure satisfies the following formula:

$$0.9 \times \lambda 2/(n2-1) \leq d1 \leq 1.5 \times \lambda 3/(n3-1)$$

where n2 represents a refractive index of a material constituting the second divergent angle-converting element for a light having a wavelength of $\lambda 2$, and n3 represents a refractive index of a material constituting the second divergent angle-converting element for a light having a wavelength of $\lambda 3$, and wherein the second diffractive structure includes plural ring shaped diffractive zones concentrically provided around an optical axis of the second divergent angle-converting element, and has a cross-section shape of a saw-tooth structure,
wherein d2, which is a height in an optical axis direction of a step between each of the ring shaped diffractive zones of the second diffractive structure satisfies at least one of the following formulas:

$$1.4 \times \lambda 2/(n2-1) \leq d2 \leq 1.8 \times \lambda 2/(n2-1)$$

$$0.9 \times \lambda 2/(n2-1) \leq d2 \leq 1.1 \times \lambda 2/(n2-1)$$

$$0.9 \times \lambda 3/(n3-1) \leq d2 \leq 1.1 \times \lambda 3/(n3-1)$$

where n2 represents a refractive index of a material constituting the second divergent angle-converting element for a light having a wavelength of $\lambda 2$, and n3 represents a refractive index of a material constituting the second divergent angle-converting element for a light having a wavelength of $\lambda 3$.

17. The optical pickup apparatus of claim 16, wherein the d2 satisfies the following relation.

$$0.9 \times \lambda 2/(n2-1) \leq d2 \leq 1.1 \times \lambda 2/(n2-1).$$

18. The optical pickup apparatus of claim 14, wherein the first diffractive structure is a superposed diffractive structure having plural ring shaped zones concentrically provided around an optical axis of the second divergent angle-converting element, and each of the ring shaped zones further includes plural concentric stair-like structures thereon,
wherein d1, which is a height in an optical axis direction of a step between each of the concentric stair-like structures of the first diffractive structure satisfies the following relation:

$$0.9 \times \lambda 2/(n2-1) \leq d1 \leq 1.5 \times \lambda 3/(n3-1)$$

where n2 represents a refractive index of a material constituting the second divergent angle-converting element for a light having a wavelength of $\lambda 2$, and n3 represents a refractive index of a material constituting the second divergent angle-converting element for a light having a wavelength of $\lambda 3$, and wherein the second diffractive structure is a superposed diffractive structure having plural ring shaped zones concentrically provided around an optical axis of the second divergent angle-converting element, and each of the ring shaped zones further includes plural concentric stair-like structures thereon,
wherein d2, which is a height in an optical axis direction of a step between each of the concentric stair-like structures of the second diffractive structure satisfies at lease one of the following formulas:

$$1.4 \times \lambda 2/(n2-1) \leq d2 \leq 1.8 \times \lambda 2/(n2-1)$$

$$0.9 \times \lambda 2/(n2-1) \leq d2 \leq 1.1 \times \lambda 2/(n2-1)$$

$$0.9 \times \lambda 3/(n3-1) \leq d2 \leq 1.1 \times \lambda 3/(n3-1)$$

where n2 represents a refractive index of a material constituting the second divergent angle-converting element for a light having a wavelength of $\lambda 2$, and n3 represents a refractive index of a material constituting the second divergent angle-converting element for a light having a wavelength of $\lambda 3$.

19. The optical pickup apparatus of claim 18, wherein the d2 satisfies the following relation.

$$0.9 \times \lambda 2/(n2-1) \leq d2 \leq 1.1 \times \lambda 2/(n2-1).$$

20. The optical pickup apparatus of claim 14, wherein the first optical surface of the second divergent angle-converting element is the light source side of the second divergent angle-converting element, wherein a first diffractive ray of the second light flux is generated by a diffraction effect of the first diffractive structure, and recording information on and/or reproducing information from the second optical information recording medium are conducted with an $n_{22}$-th order diffractive ray of the first diffractive ray of the second light flux, which is generated by a diffraction effect of the second diffractive structure, wherein a first diffractive ray of the third light flux is generated by a diffraction effect of the first diffractive structure, and recording information on and/or reproducing information from the third optical information recording medium are conducted with an $n_{23}$-th order diffractive ray of the first diffractive ray of the third light flux, which is generated by a diffraction effect of the second diffractive structure, and wherein $(n_{22}, n_{23})$, which is a combination of $n_{22}$ and $n_{23}$, satisfies the following relation.

$$(n_{22}, n_{23}) = (2, 1), (0, 1) \text{ or } (1, 0).$$

21. The optical pickup apparatus of claim 20, wherein $(n_{22}, n_{23})$ satisfies the following relation:

$$(n_{22}, n_{23}) = (0, 1), \text{ and}$$

an absolute value of a chromatic aberration, which the objective optical element possesses, is 0.10 μm/nm or less for the first light flux.

22. The optical pickup apparatus of claim 2, wherein the collimator includes a third diffractive structure provided on at least one optical surface of the collimator.

23. The optical pickup apparatus of claim 22, wherein when the wavelength of the first light flux incident to the collimator varies from λ1 to be longer, the collimator emits a divergent light flux.

24. The optical pickup apparatus of claim 23, wherein a value of a chromatic aberration, which the objective optical element has, is within a range of −0.15 μm/nm to −0.6 μm/nm for a the first light flux.

25. The optical pickup apparatus of claim 5, wherein the objective optical element includes a diffractive structure on at least one optical surface of the objective optical element.

26. The optical pickup apparatus of claim 25, wherein diffraction efficiency E3 of a diffractive ray having the maximum diffraction efficiency among diffractive rays of the third light flux generated by a diffraction effect of the diffractive structure of the objective optical element satisfies the following formula.

$$30\% \leq E3 \leq 60\%.$$

27. The optical pickup apparatus of claim 2, wherein the first light flux is incident to the objective optical element as a parallel light flux.

28. The optical pickup apparatus of claim 3, wherein the second light source and the third light source are packaged into a light source unit.

29. The optical pickup apparatus of claim 3, wherein the objective optical element is made of a plastic material.

30. The optical pickup apparatus of claim 2, further comprising:

a beam shaper provided between the first light source and the collimator.

31. The optical pickup apparatus of claim 2, wherein the second divergent angle-converting element emits the second light flux as a parallel light flux.

32. The optical pickup apparatus of claim 1, wherein the second divergent angle-converting element is made of a plastic material.

33. The optical pickup apparatus of claim 1, further comprising:

a beam splitter to conform optical paths of the first light flux, the second light flux and the third light flux, wherein each of optical surfaces of the objective optical element consists of a refractive surface, the first divergent angle-converting element includes a first diffractive structure to control a chromatic aberration of a first converged light spot formed on the information recording surface of the first optical information recording medium within a value necessary for reproducing information and/or recording information when the wavelength of the first light flux emitted from the first light source fluctuates from λ1 during the operation of the optical pickup apparatus, and the second divergent angle-converting element includes a second diffractive structure to make an divergent angle of outgoing light flux of each of the second light flux and the third light flux smaller than a respective divergent angle of the incident light flux and to emit so as to make the divergent angle of the outgoing light flux of the second light flux smaller than the divergent angle of the outgoing light flux of the third light flux.

34. The optical pickup apparatus of claim 33, wherein the second light source and the third light source are packaged in a light source unit.

35. The optical pickup apparatus of claim 33, wherein the chromatic aberration is controlled within the value necessary for reproducing and/or recording information for the first optical information recording medium by controlling an absolute value of a chromatic aberration of the first converged light spot formed on the information recording surface of the first optical information recording medium with the first light flux to be not more than 0.15 μm.

36. The optical pickup apparatus of claim 33, wherein the chromatic aberration is controlled within the value necessary for reproducing and/or recording information for the second optical information recording medium by controlling an absolute value of a chromatic aberration of the second converged light spot formed on the information recording surface of the second optical information recording medium with the second light flux to be not more than 0.2 μm.

37. The optical pickup apparatus of claim 33, wherein the second divergent angle-converting element emits the second light flux as a parallel light flux and the third light flux as a divergent light flux.

38. The optical pickup apparatus of claim 37, wherein the first divergent angle-converting element emits the first light flux as a parallel light flux or a convergent light flux.

39. The optical pickup apparatus of claim 33, wherein the second divergent angle-converting element emits both of the second light flux and the third light flux as a divergent light flux.

40. The optical pickup apparatus of claim 39, wherein the first divergent angle-converting element emits the first light flux as a parallel light flux.

41. The optical pickup apparatus of claim 33, wherein the second divergent angle-converting element emits the second light flux as a convergent light flux and the third light flux as a divergent light flux.

42. The optical pickup apparatus of claim 41, wherein the first divergent angle-converting element emits the first light flux as a parallel light flux.

43. The optical pickup apparatus of claim 33, wherein the thickness t1 satisfies the following formula.

$$0.5 \leq t1 \leq 0.7.$$

44. The optical pickup apparatus of claim 33, wherein the thickness t1 satisfies the following formula.

$$0.08 \leq t1 \leq 0.12.$$

45. The optical pickup apparatus of claim 33, further comprising:
 a beam expander provided on an optical path of the first light flux.

46. A divergent angle-converting element for use in an optical pickup apparatus for conducting reproducing information from and/or recording information on a first optical information recording medium including a first protective substrate having a thickness t1 on an information recording surface with a first light flux having a wavelength $\lambda 1$ (380 nm $\leq \lambda 1 \leq$ 450 nm) emitted from a first light source, for conducting reproducing information from and/or recording information on a second optical information recording medium including a second protective substrate having a thickness t2 (t1 $\leq$ t2) on an information recording surface with a second light flux having a wavelength $\lambda 2$ (600 nm $\leq \lambda 2 \leq$ 700 nm) emitted from a second light source, and for conducting reproducing information from and/or recording information on a third optical information recording medium including a third protective substrate having a thickness t3 (t2 $\leq$ t3) on an information recording surface with a second light flux having a wavelength $\lambda 3$ (750 nm $\leq \lambda 3 \leq$ 800 nm) emitted from a third light source,
 wherein m2, which is an optical magnification of the divergent angle-converting element for the second light flux when the second light flux passes through the divergent angle-converting element, is different from m3, which is an optical magnification of the second divergent angle-converting element for the third light flux when the third light flux passes through the divergent angle-converting element, and
 wherein T2, which is a distance between a luminous point of the second light source and the information recording surface of the second optical information recording medium, and T3, which is a distance between a luminous point of the third light source and the information recording surface of the third optical information recording medium, satisfy the following equation.

$$T2+0.6=T3.$$

47. The divergent angle-converting element of claim 46, wherein the thickness t1 and the thickness t2 satisfy the following equation.

$$t1=t2.$$

48. The divergent angle-converting element of claim 46, wherein the optical magnification m2 and the optical magnification m3 satisfy the following formulas.

$$-1/50 \leq m2 \leq 1/50$$

$$1/10 \leq m3 \leq 1/4.$$

49. The divergent angle-converting element of claim 46, wherein a first diffractive structure is provided on a first optical surface of the divergent angle-converting element.

50. The divergent angle-converting element of claim 49, wherein the first diffractive structure includes plural ring shaped diffractive zones concentrically provided around an optical axis of the divergent angle-converting element, and has a cross-section shape of a saw-tooth structure.

51. The divergent angle-converting element of claim 50, wherein d1, which is a height in an optical axis direction of a step between each of the ring shaped diffractive zones satisfies the following relation;

$$0.9 \times \lambda 2/(n2-1) \leq d1 \leq 1.5 \times \lambda 3/(n3-1)$$

where n2 represents a refractive index of a material constituting the divergent angle-converting element for a light having a wavelength of $\lambda 2$, and n3 represents a refractive index of a material constituting the divergent angle-converting element for a light having a wavelength of $\lambda 3$.

52. The divergent angle-converting element of claim 50, wherein recording information on and/or reproducing information from the second optical information recording medium are conducted with a first-order diffractive ray of the second light flux, which is generated by a diffraction effect of the first diffractive structure, and
 wherein recording information on and/or reproducing information from the third optical information recording medium are conducted with a first-order diffractive ray of the third light flux, which is generated by a diffraction effect of the first diffractive structure.

53. The divergent angle-converting element of claim 49, wherein the first diffractive structure is a superposed diffractive structure having plural ring shaped zones concentrically provided around an optical axis of the divergent angle-converting element, and each of the ring shaped zones further includes plural concentric stair-like structures thereon.

54. The divergent angle-converting element of claim 53, wherein d1, which is a height in an optical axis direction of a step between each of the concentric stair-like structures satisfies the following relation:

$$0.9 \times \lambda 2/(n2-1) \leq d1 \leq 1.5 \times \lambda 3/(n3-1)$$

where n2 represents a refractive index of a material constituting the divergent angle-converting element for a light having a wavelength of $\lambda 2$, and n3 represents a refractive index of a material constituting the divergent angle-converting element for a light having a wavelength of $\lambda 3$.

55. The divergent angle-converting element of claim 49, wherein a second diffractive structure is provided on a second optical surface of the divergent angle-converting element,
 wherein the second optical surface is an optical surface other than the first optical surface.

56. The divergent angle-converting element of claim 55, wherein the first diffractive structure includes plural ring shaped diffractive zones concentrically provided around an optical axis of the divergent angle-converting element, and has a cross-section shape of a saw-tooth structure,
 wherein d1, which is a height in an optical axis direction of a step between each of the ring shaped diffractive zones of the first diffractive structure satisfies the following formula:

$$0.9 \times \lambda 2/(n2-1) \leq d1 \leq 1.5 \times \lambda 3/(n3-1)$$

where n2 represents a refractive index of a material constituting the divergent angle-converting element for a light having a wavelength of λ2, and n3 represents a refractive index of a material constituting the divergent angle-converting element for a light having a wavelength of λ3, and wherein the second diffractive structure includes plural ring shaped diffractive zones concentrically provided around an optical axis of the divergent angle-converting element, and has a cross-section shape of a saw-tooth structure, wherein d2, which is a height in an optical axis direction of a step between each of the ring shaped diffractive zones of the second diffractive structure satisfies at least one of the following formulas:

$$1.4 \times \lambda2/(n2-1) \leq d2 \leq 1.8 \times \lambda2/(n2-1)$$

$$0.9 \times \lambda2/(n2-1) \leq d2 \leq 1.1 \times \lambda2/(n2-1)$$

$$0.9 \times \lambda3/(n3-1) \leq d2 \leq 1.1 \times \lambda/(n3-1)$$

where n2 represents a refractive index of a material constituting the divergent angle-converting element for a light having a wavelength of λ2, and n3 represents a refractive index of a material constituting the divergent angle-converting element for a light having a wavelength of λ3.

57. The divergent angle-converting element of claim 56, wherein the d2 satisfies the following relation.

$$0.9 \times \lambda2/(n2-1) \leq d2 \leq 1.1 \times \lambda2/(n2-1).$$

58. The divergent angle-converting element of claim 55, wherein the first diffractive structure is a superposed diffractive structure having plural ring shaped zones concentrically provided around an optical axis of the divergent angle-converting element, and each of the ring shaped zones further includes plural concentric stair-like structures thereon, wherein d1, which is a height in an optical axis direction of a step between each of the concentric stair-like structures of the first diffractive structure satisfies the following relation:

$$0.9 \times \lambda2/(n2-1) \leq d1 \leq 1.5 \times \lambda3/(n3-1)$$

where n2 represents a refractive index of a material constituting the divergent angle-converting element for a light having a wavelength of λ2, and n3 represents a refractive index of a material constituting the divergent angle-converting element for a light having a wavelength of λ3, and wherein the second diffractive structure is a superposed diffractive structure having plural ring shaped zones concentrically provided around an optical axis of the second divergent angle-converting element, and each of the ring shaped zones further includes plural concentric stair-like structures thereon, wherein d2, which is a height in an optical axis direction of a step between each of the concentric stair-like structures of the second diffractive structure satisfies at lease one of the following formulas:

$$1.4 \times \lambda2/(n2-1) \leq d2 \leq 1.8 \times \lambda2/(n2-1)$$

$$0.9 \times \lambda2/(n2-1) \leq d2 \leq 1.1 \times \lambda2/(n2-1)$$

$$0.9 \times \lambda3/(n3-1) \leq d2 \leq 1.1 \times \lambda3/(n3-1)$$

where n2 represents a refractive index of a material constituting the divergent angle-converting element for a light having a wavelength of λ2, and n3 represents a refractive index of a material constituting the divergent angle-converting element for a light having a wavelength of λ3.

59. The divergent angle-converting element of claim 58, wherein the d2 satisfies the following relation.

$$0.9 \times \lambda2/(n2-1) \leq d2 \leq 1.1 \times \lambda2/(n2-1).$$

60. The divergent angle-converting element of claim 55, wherein when a wavelength of a light flux, which is incident to the divergent angle-converting element, varies to be longer, the divergent angle-converting element makes a divergent angle of an outgoing light flux from the divergent angle-converting element larger than a divergent angle before the wavelength variation.

61. The divergent angle-converting element of claim 60, wherein the first optical surface of the divergent angle-converting element is the light source side of the divergent angle-converting element, wherein a first diffractive ray of the second light flux is generated by a diffraction effect of the first diffractive structure, and recording information on and/or reproducing information from the second optical information recording medium are conducted with an $n_{22}$-th order diffractive ray of the first diffractive ray of the second light flux, which is generated by a diffraction effect of the second diffractive structure, wherein a first diffractive ray of the third light flux is generated by a diffraction effect of the first diffractive structure, and recording information on and/or reproducing information from the third optical information recording medium are conducted with an $n_{23}$-th order diffractive ray of the first diffractive ray of the third light flux, which is generated by a diffraction effect of the second diffractive structure, and wherein ($n_{23}$, $n_{23}$), which is a combination of $n_{22}$ and $n_{23}$, satisfies the following relation.

$$(n_{23}, n_{23}) = (2, 1), (0, 1) \text{ or } (1, 0).$$

62. The divergent angel-converting element of claim 60, wherein the divergent angel-converting element emits the second light flux as a parallel light flux.

63. The divergent angel-converting element of claim 60, wherein the divergent angel-converting element is made of a plastic material.

* * * * *